US012799365B2

(12) United States Patent
Onishi et al.

(10) Patent No.: US 12,799,365 B2
(45) Date of Patent: Nov. 17, 2026

(54) POLISHING COMPOSITION

(71) Applicant: FUJIMI INCORPORATED, Kiyosu (JP)

(72) Inventors: Shogo Onishi, Tualatin, OR (US); Alexandra Carlson, Tualatin, OR (US)

(73) Assignee: FUJIMI INCORPORATED, Kiyosu (JP)

( * ) Notice: Subject to any disclaimer, the term of this patent is extended or adjusted under 35 U.S.C. 154(b) by 242 days.

(21) Appl. No.: 18/887,828

(22) Filed: Sep. 17, 2024

(65) Prior Publication Data

US 2025/0101262 A1 Mar. 27, 2025

Related U.S. Application Data

(60) Provisional application No. 63/540,817, filed on Sep. 27, 2023.

(51) Int. Cl.
*C09G 1/02* (2006.01)

(52) U.S. Cl.
CPC .................................... *C09G 1/02* (2013.01)

(58) Field of Classification Search
None
See application file for complete search history.

(56) References Cited

U.S. PATENT DOCUMENTS

2007/0128872 A1 6/2007 Itoh et al.
2009/0239380 A1 9/2009 Tomiga et al.
2021/0108106 A1* 4/2021 Liang ........................ B24B 1/00
2025/0206985 A1* 6/2025 Kim ......................... C09G 1/02

FOREIGN PATENT DOCUMENTS

WO WO-2023/189899 A1 10/2023

OTHER PUBLICATIONS

Extended European Search Report on EP Application No. 24201791.1 Dated Feb. 11, 2025 (9 pages).
U.S. Appl. No. 63/326,505, filed Apr. 1, 2022, Anthony Y. Kim et al.
E. Cano-Serrano et al., "Sulfonic acid-functionalized silica through quantitative oxidation of thiol groups", Chem. Commun., pp. 246-247 (2003).
G.W. Sears, "Determination of Specific Surface Area of Colloidal Silica by Titration with Sodium Hydroxide," 28 Analytical Chem. 1982-83 (1956).
K. Yamaguchi et al., "Novel Silane Coupling Agents Containing a Photolabile 2-Nitrobenzyl Ester for Introduction of a Carboxy Group on the Surface of Silica Gel", 3 Chem. Lett. 228-29 (2000).

* cited by examiner

*Primary Examiner* — Roberts P Culbert
(74) *Attorney, Agent, or Firm* — Foley & Lardner LLP

(57) ABSTRACT

Polishing compositions and methods are provided which enable barrier polishing with tunable removal rate ratios for copper, tantalum, and TEOS. Polishing compositions comprising silica particles (greater than 12 nm), a metal corrosion inhibitor, and a phosphate surfactant are capable of achieving Ta to TEOS selectivities of greater than 1 and low Co removal rates (e.g., less than 200 Å/min), allowing for good topography correction (e.g., reduced dishing).

13 Claims, 3 Drawing Sheets

| Pattern | A | B |
|---|---|---|
| 1/9 | 1 µm | 9 µm |

POLISHING COMPOSITION

CROSS-REFERENCE TO RELATED APPLICATIONS

This application claims the benefit of and priority to U.S. Provisional Application No. 63/540,817, filed on Sep. 27, 2023, which is incorporated by reference herein in its entirety.

TECHNICAL FIELD

The following description of the background of the present technology is provided simply as an aid in understanding the present technology and is not admitted to describe or constitute prior art to the present technology.

One of the principal chemical mechanical polishing (CMP) challenges for semiconductor manufacturing is the selective polishing of certain materials. Copper (Cu) is widely used as an interconnect material in semiconductor device fabrication, while tantalum (Ta), cobalt (Co) and combinations thereof, are widely used as barrier materials, and $SiO_2$ derived from tetraethylorthosilicate (TEOS) is widely used as a substrate material. Here, $SiO_2$ derived from tetraethylorthosilicate (TEOS) is also simply referred to as TEOS. Thus, there exists a need for chemical mechanical polishing compositions which minimize loss of Cu interconnects during a barrier polishing steps by offering tunable Cu, Ta, and TEOS removal rates and by affording high tantalum-to-TEOS removal rate (RR) selectivity (e.g., $RR_{Ta}/RR_{TEOS}$ greater than about 1.2) and low copper removal rates (e.g., less than about 200 Å/min). There also exists a need for chemical mechanical polishing compositions and methods which achieve good topography correction in terms of Cu dishing relative to TEOS. It is against this backdrop that the polishing compositions and methods of the present disclosure were developed.

SUMMARY OF THE INVENTION

In one aspect, which may be combined with any other aspect or embodiment, the present disclosure relates to a polishing composition, comprising: an abrasive comprising silica particles having an average primary particle size of 30 nm or greater; a phosphate surfactant; a corrosion inhibitor; and a water-soluble polymer, wherein the pH of the polishing composition is from 7 to 11.

In some embodiments, the silica particles have an average primary particle size of 30 nm or greater and less than or equal to 80 nm. In some embodiments, the abrasive is present in the polishing composition at a concentration of about 1.0 wt. % to about 5.0 wt. %. In some embodiments, the abrasive is present in the polishing composition at a concentration of about 2.0 wt. % to about 3.0 wt. %.

In some embodiments, the silica particles are surface-modified with a sulfonic acid.

In some embodiments, the silica particles have a D90/D10 of greater than 1.3. In some embodiments, the silica particles have a D90/D10 of greater than 1.7.

In some embodiments, the phosphate surfactant comprises a polyoxyethylene alkylphenyl ether phosphate or a polyoxyethylene alkenyl ether phosphate. In some embodiments, the phosphate surfactant comprises a polyoxyethylene alkylphenyl ether phosphate having 5 to 16 oxyethylene units. In some embodiments, the phosphate surfactant comprises polyoxyethylene (7) nonylphenyl phosphate.

In some embodiments, the phosphate surfactant is present at a concentration of 0.01 wt. % to 1.0 wt. %, relative to the total weight of the composition. In some embodiments, the phosphate surfactant is present at a concentration of 0.005 wt. % to 0.3 wt. %, relative to the total weight of the composition.

In some embodiments, the corrosion inhibitor is a triazole. In some embodiments, the corrosion inhibitor comprises benzotriazole.

In some embodiments, the corrosion inhibitor is present at a concentration of about 0.01 wt. % to about 0.20 wt. %. In some embodiments, the corrosion inhibitor is present at a concentration of about 0.05 wt. % to about 0.10 wt. %.

In some embodiments, the water-soluble polymer is present at a concentration of about 0.01 wt. % to about 0.50 wt. %. In some embodiments, the water-soluble polymer is a polysaccharide present at a concentration of about 0.05 wt. % to about 0.10 wt. %.

In some embodiments, the water-soluble polymer is a polysaccharide. In some embodiments, the water-soluble polymer comprises pullulan.

In some embodiments, the polishing composition comprises an organic acid, present at a concentration of about 0.01 wt. % to about 0.50 wt. %. In some embodiments, the organic acid comprises citric acid.

In some embodiments, the polishing composition comprises an electric conductivity controller. In some embodiments, the electric conductivity controller comprises tripotassium citrate.

In another aspect, which may be combined with any other aspect or embodiment, the present disclosure relates to a method of polishing a substrate surface, wherein the substrate surface comprises copper and TEOS, the method comprising: contacting the substrate surface with the polishing composition according to any of the embodiments disclosed herein; and moving the polishing pad against the substrate surface while the polishing composition is in contact with the substrate surface, wherein the polishing achieves a topography correction of 30 nm or greater in terms of Cu dishing relative to the TEOS surface.

In some embodiments, the polishing achieves a copper removal rate of 200 Å/min or less. In some embodiments, the polishing achieves a copper removal rate of 150 Å/min or greater. In some embodiments, the polishing achieves a copper removal rate of 180 Å/min or greater.

In some embodiments, the polishing achieves a TEOS removal rate of 100 Å/min or greater. In some embodiments, the polishing achieves a TEOS removal rate of 110 Å/min or greater.

In some embodiments, the polishing achieves a tantalum removal rate of 100 Å/min or greater. In some embodiments, the polishing achieves a tantalum removal rate of 110 Å/min or greater. In some embodiments, the polishing achieves a tantalum removal rate of 140 Å/min or greater.

In some embodiments, the polishing achieves a Ta/TEOS polishing rate ratio of 1.00 or greater. In some embodiments, the polishing achieves a Ta/TEOS polishing rate ratio of 1.20 or greater. In some embodiments, the polishing achieves a Ta/TEOS polishing rate ratio of 1.30 or greater.

Figure 1A:
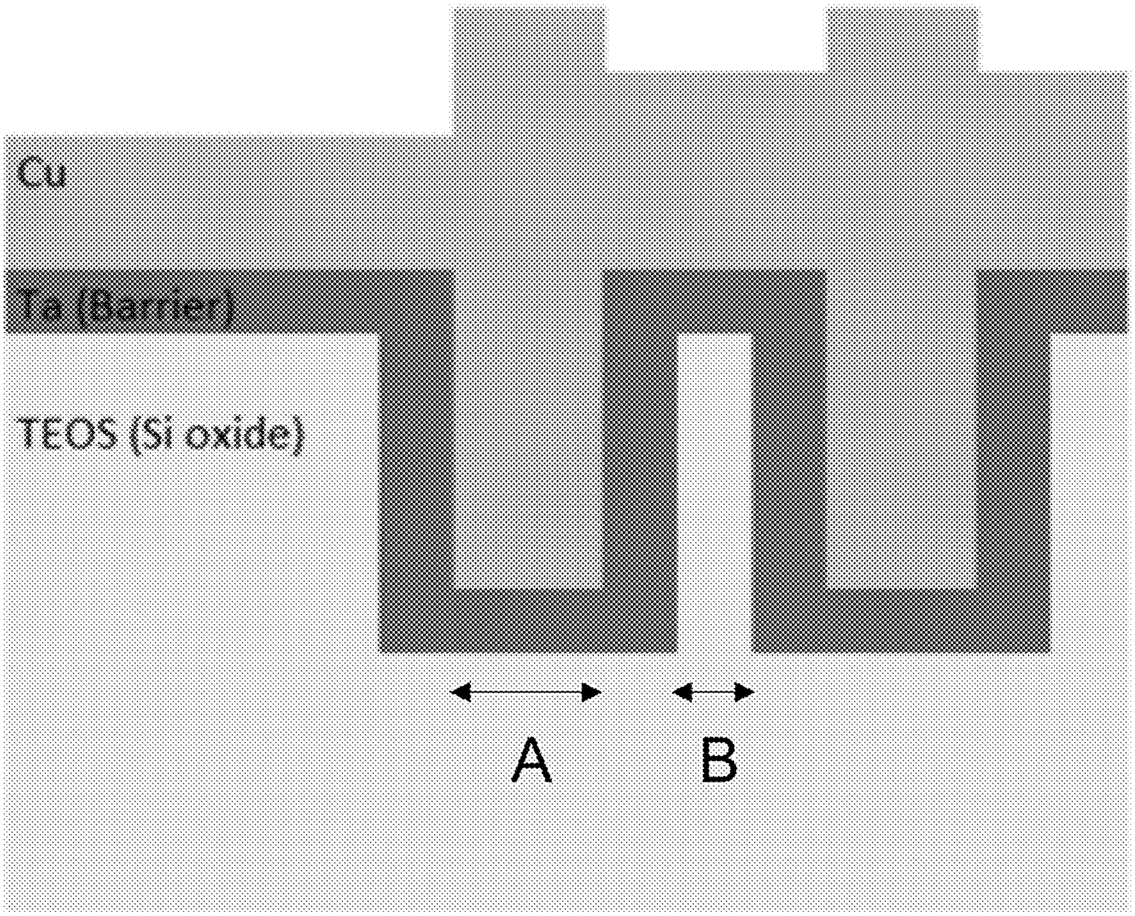
FIG. 1A is a schematic illustration (not to scale) of a Si wafer with a 3000 Å thermal oxide layer patterned with 1-μm trenches (A) having 9-μm inter-trench spacing (B), onto which a 150 Å tantalum (Ta) barrier layer, and 7000 Å copper (Cu) layer have been deposited to simulate interconnects.

Reference will now be made in detail to some specific embodiments contemplated by the present disclosure. While various embodiments are described herein, it will be understood that it is not intended to limit the present technology to the described embodiments. On the contrary, it is intended to cover alternatives, modifications, and equivalents as may be included within the spirit and scope of the technology as defined by the appended claims.

DETAILED DESCRIPTION OF THE INVENTION

The following describes in detail the present invention. "X to Y" is used herein in the sense of including the numerical values (X and Y) listed before and after it as lower and upper limits, and means "X or more and Y or less". If a plurality of "X to Y" is listed, e.g., if "X1 to Y1, or X2 to Y2" is listed, disclosures with each numerical value as an upper limit, disclosures with each numerical value as a lower limit, and combinations of those upper and lower limits are all disclosed (i.e., can be taken as a legal basis for amendment). Specifically, amendments of X1 or more, Y2 or less, X1 or less, Y2 or more, X1 to X2, X1 to Y2, etc. shall all be deemed legal. In addition, unless otherwise specified, the operations and measurements of physical properties, etc., are performed at room temperature (20 to 25° C.)/relative humidity of 40 to 50% RH. The concentrations listed herein may be the concentrations at the point of use (POU), or the concentrations before dilution to the concentrations at the POU. The dilution factor may be 2 to 10. It shall also be understood that the combinations of all embodiments and descriptions disclosed herein are disclosed in the present application. In other words, it shall be understood that they can be taken as a basis for amendment. In addition, the description of the content or concentration of each component can be the total amount when two or more components are contained.

Polishing Composition

The polishing compositions may also be herein simply referred to as "compositions."

The present disclosure relates to a polishing compositions and methods for improving topography correction and reducing dishing on substrates (e.g., Si) having an $SiO_2$ layer derived from TEOS (i.e., a "TEOS substrate") with a barrier layer (e.g., Ta) and metal layer (e.g., Cu interconnects), during chemical mechanical polishing (CMP). Polishing compositions according to the present disclosure comprise: an abrasive comprising silica particles having an average primary particle size of 30 nm or greater; a phosphate surfactant; a corrosion inhibitor; and a water-soluble polymer, wherein the pH of the polishing composition is from 7 to 11.

In some embodiments, polishing compositions comprising an abrasive comprising silica particles having an average primary particle size of greater than 12 nm, and/or an average secondary particle size of greater than 30 nm; a phosphate surfactant; a water-soluble polymer; and an electric conductivity controller, wherein the silica particles have a D90/D50 ratio of greater than 1.3 or a D90/D10 ratio of greater than 1.7, and/or are surface-modified with an organic acid, the phosphate surfactant has 15 or less oxyethylene units and a straight chain or branched $C_4$ or more alkylphenyl, and is present at a concentration of less than 0.5 wt. %, relative to the total weight of the polishing composition, the electric conductivity controller is present at a concentration of less than 1 wt. %, relative to the total weight of the polishing composition, and a pH of the polishing composition is greater than 8 and less than 11, are provided.

Abrasives

Polishing compositions according to the present disclosure comprise abrasive particles (i.e., "abrasive grains") suitable for polishing a substrate comprising Cu, Ta, and one or more dielectric materials (e.g., BD, $SiO_2$ (e.g., derived from TEOS), etc.). In some embodiments, the abrasive particles comprise one or more metal oxide particles, e.g., zirconia, hafnia, alumina, titania, silica, ceria, and any combination thereof. In some embodiments, the abrasive particles comprise colloidal silica, colloidal zirconia, or combinations thereof. In some embodiments, the abrasive particles comprise colloidal silica. In addition, the abrasive particles may be a commercial product, synthetic product, or any combination thereof. In some embodiments, the abrasive particles may be anionic. Within the context of this application, "anionic" particles have a negative surface charge or negative zeta potential at the pH of the polishing composition.

In some embodiments, the abrasive particles are surface-modified by a chemical species covalently attached to the particle surface and having a terminal anionic group. In some embodiments, the abrasive particles comprise colloidal particles which are anionically modified, e.g., by immobilization of an organic acid on the colloidal particle surface. In some embodiments, the terminal anionic group is a sulfonic acid group or a carboxy group.

In some embodiments, immobilization of an organic acid on the surface of the abrasive particles (e.g., colloidal silica) in the polishing composition may be carried out by chemically bonding a functional group of the organic acid to the surface of the abrasive particle (e.g., colloidal silica). The immobilization of an organic acid on colloidal silica cannot be achieved by only allowing colloidal silica and an organic acid to merely coexist. The immobilization of an organic acid (e.g., a sulfonic acid), on colloidal silica can be carried out, for example, by a method described in E. Cano-Serrano et al., Sulfonic acid-functionalized silica through quantitative oxidation of thiol groups, Chem. Commun. 246-47 (2003), which is hereby incorporated by reference in its entirety. Specifically, colloidal silica with a sulfonic acid immobilized on its surface can be obtained by coupling a silane coupling agent having a thiol group, such as 3-mercaptopropyl trimethoxysilane ("MPS"), to colloidal silica, followed by oxidizing the thiol group with hydrogen peroxide to form a surface-immobilized sulfonic acid (e.g., a surface-bound propane sulfonic acid, such as oxidized MPS). Such silica abrasives are non-limiting examples of "sulfonic acid-modified" abrasives.

The immobilization of a carboxylic acid on colloidal silica can be carried out, for example, by a method described in Y. Kazuo et al., Novel Silane Coupling Agents Containing a Photolabile 2-Nitrobenzyl Ester for Introduction of a Carboxy Group on the Surface of Silica Gel, 3 Chem. Lett. 228-29 (2000), which is hereby incorporated by reference in its entirety. Specifically, colloidal silica in which a carboxylic acid is immobilized on its surface can be obtained by coupling a silane coupling agent including photoreactive 2-nitrobenzyl ester to colloidal silica, followed by photoirradiation. Such silica abrasives are non-limiting examples of "carboxylic acid-modified" abrasives.

These examples of organic acid immobilization on colloidal silica are intended to be exemplary and are not intended to be limiting. Other organic immobilization techniques using different organic acids and different abrasive particle materials (e.g., other than colloidal silica) are intended to be encompassed within the scope of the present disclosure. In some embodiments, the silica particles are colloidal silica particles in which an organic acid (carboxylic acid) is immobilized on its surface. In some embodiments, the silica particles are colloidal silica particles in which an organic acid (sulfonic acid) is immobilized on its surface.

In some embodiments, the abrasive particles have an average primary particle diameter of greater than or equal to about 30 nm, greater than or equal to about 31 nm, greater than or equal to about 32 nm, greater than or equal to about 33 nm, greater than or equal to about 34 nm, greater than or equal to about 35 nm, greater than or equal to about 36 nm, greater than or equal to about 37 nm, greater than or equal to about 38 nm, greater than or equal to about 39 nm, greater than or equal to about 40 nm, greater than or equal to about 45 nm, greater than or equal to about 50 nm, greater than or equal to about 55 nm, greater than or equal to about 60 nm, greater than or equal to about 65 nm, greater than or equal to about 70 nm, greater than or equal to about 75 nm, greater than or equal to about 80 nm, greater than or equal to about 85 nm, greater than or equal to about 90 nm, greater than or equal to about 95 nm, greater than or equal to about 100 nm, greater than or equal to about 110 nm, greater than or equal to about 120 nm, greater than or equal to about 130 nm, greater than or equal to about 140 nm, greater than or equal to about 150 nm, or any range or value therein between. In some embodiments, the abrasive particles have an average primary particle diameter of greater than 12 nm, greater than or equal to 13 nm, greater than or equal to 15 nm, greater than or equal to 17 nm, greater than or equal to 19 nm, greater than or equal to 21 nm, greater than or equal to 23 nm, greater than or equal to 25 nm, greater than or equal to 29 nm, greater than or equal to 30 nm, or any range or value therein between.

The average primary particle diameter of abrasive grains can be measured by a field emission scanning electron microscope (FE-SEM) (manufacturer and model number: Hitachi High-Technologies Corporation S-4800).

Here, the range can be expressed herein as from "about" one specific value and/or to "about" another specific value. When such a range is expressed, another aspect includes one specific value and/or to another specific value. Similarly, by using the antecedent "about," it will be understood that when a value is expressed as an approximation, another aspect is formed by the specific value. It will be further understood that the endpoints of each range are significant in relation to, and independently of, the other endpoint. It will also be understood that there are many values disclosed herein and each value is disclosed herein as "about" that specific value in addition to the value itself. For example, if the value "10" is disclosed, "about 10" is also disclosed. It will also be understood that each unit between two specific units is also disclosed. For example, if 10 and 15 are disclosed, 11, 12, 13, and 14 are also disclosed. In the present specification, about X (X is a number) can mean that ±10% or ±5% of X is included, and for example, ±10% means X×0.9 to X×1.1. In addition, about X may be X itself.

In some embodiments, the abrasive particles have an average primary particle diameter of less than or equal to about 150 nm, less than or equal to about 140 nm, less than or equal to about 130 nm, less than or equal to about 120 nm, less than or equal to about 110 nm, less than or equal to about 100 nm, less than or equal to about 95 nm, less than or equal to about 90 nm, less than or equal to about 85 nm, less than or equal to about 80 nm, less than or equal to about 75 nm, less than or equal to about 70 nm, less than or equal to about 65 nm, less than or equal to about 60 nm, less than or equal to about 55 nm, less than or equal to about 50 nm, less than or equal to about 49 nm, less than or equal to about 48 nm, less than or equal to about 47 nm, less than or equal to about 46 nm, less than or equal to about 45 nm, less than or equal to about 44 nm, less than or equal to about 43 nm, less than or equal to about 42 nm, less than or equal to about 41 nm, less than or equal to about 40 nm, less than or equal to about 39 nm, less than or equal to about 38 nm, less than or equal to about 37 nm, less than or equal to about 36 nm, less than or equal to about 35 nm, or any range or value therein between.

In some embodiments, the abrasive particles have an average primary particle diameter of about 30 nm to about 150 nm, about 30 nm to about 100 nm, about 30 nm to about 90 nm, about 30 nm to about 80 nm, about 30 nm to about 70 nm, about 30 nm to about 60 nm, about 30 nm to about 50 nm, about 30 nm to about 45 nm, about 30 nm to about 40 nm, about 30 nm to about 35 nm, greater than 30 nm to about 150 nm, greater than 30 nm to about 100 nm, greater than 30 nm to about 90 nm, greater than 30 nm to about 80 nm, greater than 30 nm to about 70 nm, greater than 30 nm to about 60 nm, greater than 30 nm to about 50 nm, greater than 30 nm to about 45 nm, greater than 30 nm to about 40 nm, greater than 30 nm to about 35 nm, about 32 nm to about 150 nm, about 32 nm to about 100 nm, about 32 nm to about 90 nm, about 32 nm to about 80 nm, about 32 nm to about 70 nm, about 32 nm to about 60 nm, about 32 nm to about 50 nm, about 32 nm to about 45 nm, about 32 nm to about 40 nm, about 32 nm to about 35 nm, about 35 nm to about 150 nm, about 35 nm to about 100 nm, about 35 nm to about 90 nm, about 35 nm to about 80 nm, about 35 nm to about 70 nm, about 35 nm to about 60 nm, about 35 nm to about 50 nm, about 35 nm to about 45 nm, about 35 nm to about 40 nm, about 40 nm to about 150 nm, about 40 nm to about 100 nm, about 40 nm to about 90 nm, about 40 nm to about 80 nm, about 40 nm to about 70 nm, about 40 nm to about 60 nm, about 40 nm to about 50 nm, about 40 nm to about 45 nm, about 45 nm to about 150 nm, about 45 nm to about 100 nm, about 45 nm to about 90 nm, about 45 nm to about 80 nm, about 45 nm to about 70 nm, about 45 nm to about 60 nm, about 45 nm to about 50 nm, about 50 nm to about 150 nm, about 50 nm to about 100 nm, about 50 nm to about 90 nm, about 50 nm to about 80 nm, about 50 nm to about 70 nm, about 50 nm to about 60 nm, about 60 nm to about 150 nm, about 60 nm to about 100 nm, about 60 nm to about 90 nm, about 60 nm to about 80 nm, about 60 nm to about 70 nm, about 70 nm to about 100 nm, about 70 nm to about 90 nm, about 70 nm to about 80 nm, or any range or value therein. In some embodiments, the abrasive particles have an average primary particle diameter of 15 to 35 nm. In some embodiments, the abrasive particles have an average primary particle diameter of less than 78 nm.

In some embodiments, the abrasive particles have an average secondary particle diameter of greater than or equal to about 50 nm, greater than or equal to about 51 nm, greater than or equal to about 52 nm, greater than or equal to about 53 nm, greater than or equal to about 54 nm, greater than or equal to about 55 nm, greater than or equal to about 56 nm, greater than or equal to about 57 nm, greater than or equal to about 58 nm, greater than or equal to about 59 nm, greater than or equal to about 60 nm, greater than or equal to about 61 nm, greater than or equal to about 62 nm, greater than or equal to about 63 nm, greater than or equal to about 64 nm, greater than or equal to about 65 nm, greater than or equal to about 66 nm, greater than or equal to about 67 nm, greater than or equal to about 68 nm, greater than or equal to about 69 nm, greater than or equal to about 70 nm, greater than or equal to about 75 nm, greater than or equal to about 80 nm, greater than or equal to about 85 nm, greater than or equal to about 90 nm, greater than or equal to about 95 nm, greater than or equal to about 100 nm, greater than or equal to about 110 nm, greater than or equal to about 120 nm, greater than or equal to about 130 nm, greater than or equal to about 140 nm, greater than or equal to about 150 nm, or any range or value therein between. In some embodiments, the abrasive particles have an average secondary particle diameter of greater than 30 nm, greater than or equal to 35 nm, greater than or equal to 40 nm, greater than or equal to 45 nm, or any range or value therein between. A particle size analyzer (Horiba particle size analyzer) can measure the average secondary particle diameter of abrasive grains.

In some embodiments, the abrasive particles have an average secondary particle diameter of less than or equal to about 150 nm, less than or equal to about 140 nm, less than or equal to about 130 nm, less than or equal to about 120 nm, less than or equal to about 110 nm, less than or equal to about 100 nm, less than or equal to about 95 nm, less than or equal to about 90 nm, less than or equal to about 85 nm, less than or equal to about 80 nm, less than or equal to about 75 nm, less than or equal to about 70 nm, less than or equal to about 65 nm, less than or equal to about 60 nm, less than or equal to about 55 nm, or any range or value therein between. In some embodiments, the abrasive particles have an average secondary particle diameter of less than 120 nm.

In some embodiments, the abrasive particles have an average secondary particle diameter of about 50 nm to about 150 nm, about 50 nm to about 100 nm, about 50 nm to about 90 nm, about 50 nm to about 80 nm, about 50 nm to about 70 nm, about 50 nm to about 60 nm, about 60 nm to about 150 nm, about 60 nm to about 100 nm, about 60 nm to about 90 nm, about 60 nm to about 80 nm, about 60 nm to about 70 nm, about 70 nm to about 150 nm, about 70 nm to about 100 nm, about 70 nm to about 90 nm, about 70 nm to about 80 nm, about 80 nm to about 150 nm, about 80 nm to about 100 nm, about 80 nm to about 90 nm, or any range or value therein.

In some embodiments, the abrasive particles are present in the composition at a concentration by weight, relative to the total weight of the composition, of greater than or equal to about 0.1 wt. %, greater than or equal to about 0.15 wt. %, greater than or equal to about 0.2 wt. %, greater than or equal to about 0.25 wt. %, greater than or equal to about 0.3 wt. %, greater than or equal to about 0.35 wt. %, greater than or equal to about 0.4 wt. %, greater than or equal to about 0.45 wt. %, greater than or equal to about 0.5 wt. %, greater than or equal to about 0.55 wt. %, greater than or equal to about 0.60 wt. %, greater than or equal to about 0.65 wt. %, greater than or equal to about 0.7 wt. %, greater than or equal to about 0.75 wt. %, greater than or equal to about 0.8 wt. %, greater than or equal to about 0.85 wt. %, greater than or equal to about 0.9 wt. %, greater than or equal to about 0.95 wt. %, greater than or equal to about 1.0 wt. %, greater than or equal to about 1.1 wt. %, greater than or equal to about 1.2 wt. %, greater than or equal to about 1.3 wt. %, greater than or equal to about 1.4 wt. %, greater than or equal to about 1.5 wt. %, greater than or equal to about 1.6 wt. %, greater than or equal to about 1.7 wt. %, greater than or equal to about 1.8 wt. %, greater than or equal to about 1.9 wt. %, greater than or equal to about 2.0 wt. %, greater than or equal to about 2.1 wt. %, greater than or equal to about 2.2 wt. %, greater than or equal to about 2.3 wt. %, greater than or equal to about 2.4 wt. %, greater than or equal to about 2.5 wt. %, greater than or equal to about 3.0 wt. %, greater than or equal to about 3.5 wt. %, greater than or equal to about 4.0 wt. %, greater than or equal to about 4.5 wt. %, greater than or equal to about 5.0 wt. %, greater than or equal to about 5.5 wt. %, greater than or equal to about 6.0 wt. %, greater than or equal to about 6.5 wt. %, greater than or equal to about 7.0 wt. %, greater than or equal to about 7.5 wt. %, greater than or equal to about 8.0 wt. %, greater than or equal to about 8.5 wt. %, greater than or equal to about 9.0 wt. %, greater than or equal to about 9.5 wt. %, greater than or equal to about 10.0 wt. %, or any range or value therein between. In some embodiments, the abrasive particles are present in the composition at a concentration by weight, relative to the total weight of the composition, of greater than or equal to about 0.01 wt. %, greater than or equal to about 0.05 wt. %, or any range or value therein between.

The terms "D10," "D50," and "D90" refer to parameters of a particle size distribution for the abrasive particles (or abrasive grains) disclosed herein. As used herein, the term "D10" refers to the particle size (e.g., diameter) at 10% of the cumulative count from the smallest particle size in the particle size distribution histogram. That is, D10 is the particle size at which 10% of the particles in the particle size distribution have a smaller size and 90% have a larger size. Similarly, as used herein, the term "D50" refers to the particle size (e.g., diameter) at 50% of the cumulative count from the smallest particle size in the particle size distribution histogram. That is, D50 is the particle size at which 50% of the particles in the particle size distribution have a smaller size and 50% have a larger size. Likewise, "D90" refers to the particle size (e.g., diameter) at 90% of the cumulative count from the smallest particle size in the particle size distribution histogram. That is, D90 is the particle size at which 90% of the particles in the particle size distribution have a smaller size and 10% have a larger size. "D10,"

"D50," and "D90" can all be measured with the Malvern Panalytical Zetasizer Nano Light Scattering System.

The abrasive particles may have any suitable D90/D50 ratio for achieving good topography correction and Cu, Ta, and TEOS removal rates. In some embodiments, the abrasive particles have a D90/D50 ratio of at least about 1.2, at least about 1.3, at least about 1.4, at least about 1.5, at least about 1.6, at least about 1.7, at least about 1.8, or at least about 1.9. Alternatively, or in addition, in some embodiments the abrasive particles have a D90/D50 ratio of about 4.0 or less, about 3.5 or less, about 3.0 or less, about 2.5 or less, about 2.4 or less, about 2.3 or less, about 2.2. or less, about 2.1 or less, about 2.0 or less, about 1.9 or less, about 1.8 or less, about 1.7 or less, about 1.6 or less, about 1.5 or less, or any range or value therein between. In some embodiments, the abrasive particles have a D90/D50 ratio of greater than 1.3.

In some embodiments, when the silica particles are not surface-modified with an organic acid, the silica particles have a D90/D50 ratio of less than 1.9.

The abrasive particles may have any suitable D90/D10 ratio for achieving good topography correction and Cu, Ta, and TEOS removal rates. In some embodiments, the abrasive particles have a D90/D10 ratio of at least about 1.2, at least about 1.3, at least about 1.4, at least about 1.5, at least about 1.6, at least about 1.7, at least about 1.8, at least about 1.9, at least about 2.0, at least about 2.1, at least about 2.2, at least about 2.3, at least about 2.4, at least about 2.5, at least about 2.6, at least about 2.7, at least about 2.8, at least about 2.9, or at least about 3.0. Alternatively, or in addition, in some embodiments the abrasive particles have a D90/D10 ratio of about 3.5 or less, about 3.4 or less, about 3.3 or less, about 3.2 or less, about 3.1 or less, about 3.0 or less, about 2.9 or less, about 2.8 or less, about 2.7 or less, about 2.6 or less, about 2.5 or less, about 2.4 or less, about 2.3 or less, about 2.2 or less, about 2.1 or less, about 2.0 or less, about 1.9 or less, about 1.8 or less, about 1.7 or less, about 1.6 or less, about 1.5 or less, or any range or value therein between. In some embodiments, the abrasive particles have a D90/D10 ratio of greater than 1.7.

In some embodiments, the abrasive particles are present in the composition at a concentration by weight, relative to the total weight of the composition, of less than or equal to about 10.0 wt. %, less than or equal to about 9.5 wt. %, less than or equal to about 9.0 wt. %, less than or equal to about 8.5 wt. %, less than or equal to about 8.0 wt. %, less than or equal to about 7.5 wt. %, less than or equal to about 7.0 wt. %, less than or equal to about 6.5 wt. %, less than or equal to about 6.0 wt. %, less than or equal to about 5.5 wt. %, less than or equal to about 5.0 wt. %, less than or equal to about 4.5 wt. %, less than or equal to about 4.0 wt. %, less than or equal to about 3.9 wt. %, less than or equal to about 3.8 wt. %, less than or equal to about 3.7 wt. %, less than or equal to about 3.6 wt. %, less than or equal to about 3.5 wt. %, less than or equal to about 3.4 wt. %, less than or equal to about 3.3 wt. %, less than or equal to about 3.2 wt. %, less than or equal to about 3.1 wt. %, less than or equal to about 3.0 wt. %, less than or equal to about 2.9 wt. %, less than or equal to about 2.8 wt. %, less than or equal to about 2.7 wt. %, less than or equal to about 2.6 wt. %, less than or equal to about 2.5 wt. %, less than or equal to about 2.4 wt. %, less than or equal to about 2.3 wt. %, less than or equal to about 2.2 wt. %, less than or equal to about 2.1 wt. %, less than or equal to about 2.0 wt. %, less than or equal to about 1.9 wt. %, less than or equal to about 1.8 wt. %, less than or equal to about 1.7 wt. %, less than or equal to about 1.6 wt. %, less than or equal to about 1.5 wt. %, less than or equal to about 1.4 wt. %, less than or equal to about 1.3 wt. %, less than or equal to about 1.2 wt. %, less than or equal to about 1.1 wt. %, less than or equal to about 1.0 wt. %, less than or equal to about 0.95 wt. %, less than or equal to about 0.9 wt. %, less than or equal to about 0.85 wt. %, less than or equal to about 0.8 wt. %, less than or equal to about 0.75 wt. %, less than or equal to about 0.7 wt. %, less than or equal to about 0.65 wt. %, less than or equal to about 0.6 wt. %, less than or equal to about 0.55 wt. %, less than or equal to about 0.5 wt. %, less than or equal to about 0.45 wt. %, less than or equal to about 0.4 wt. %, less than or equal to about 0.35 wt. %, less than or equal to about 0.3 wt. %, less than or equal to about 0.25 wt. %, less than or equal to about 0.2 wt. %, less than or equal to about 0.15 wt. %, less than or equal to about 0.1 wt. %, or any range or value therein between.

In some embodiments, the abrasive particles are present in the composition at a concentration by weight, relative to the total weight of the composition, of about 0.1 wt. % to about 10.0 wt. %, about 0.2 wt. % to about 10.0 wt. %, about 0.3 wt. % to about 10.0 wt. %, about 0.4 wt. % to about 10.0 wt. %, about 0.5 wt. % to about 10.0 wt. %, about 0.6 wt. % to about 10.0 wt. %, about 0.7 wt. % to about 10.0 wt. %, about 0.8 wt. % to about 10.0 wt. %, about 0.9 wt. % to about 10.0 wt. %, about 1.0 wt. % to about 10.0 wt. %, about 2 wt. % to about 10.0 wt. %, about 2.2 wt. % to about 10.0 wt. %, about 2.5 wt. % to about 10.0 wt. %, about 2.8 wt. % to about 10.0 wt. %, about 3 wt. % to about 10.0 wt. %, about 3.5 wt. % to about 10.0 wt. %, about 4 wt. % to about 10.0 wt. %, about 5 wt. % to about 10.0 wt. %, about 0.1 wt. % to about 5 wt. %, about 0.2 wt. % to about 5 wt. %, about 0.3 wt. % to about 5 wt. %, about 0.4 wt. % to about 5 wt. %, about 0.5 wt. % to about 5 wt. %, about 0.6 wt. % to about 5 wt. %, about 0.7 wt. % to about 5 wt. %, about 0.8 wt. % to about 5 wt. %, about 0.9 wt. % to about 5 wt. %, about 1.0 wt. % to about 5 wt. %, about 1.5 wt. % to about 5 wt. %, about 2.0 wt. % to about 5 wt. %, about 2.2 wt. % to about 5 wt. %, about 2.5 wt. % to about 5 wt. %, about 3.0 wt. % to about 5 wt. %, about 0.1 wt. % to about 3.0 wt. %, about 0.2 wt. % to about 3.0 wt. %, about 0.3 wt. % to about 3.0 wt. %, about 0.4 wt. % to about 3.0 wt. %, about 0.5 wt. % to about 3.0 wt. %, about 0.6 wt. % to about 3.0 wt. %, about 0.7 wt. % to about 3.0 wt. %, about 0.8 wt. % to about 3.0 wt. %, about 0.9 wt. % to about 3.0 wt. %, about 1.0 wt. % to about 3.0 wt. %, about 1.2 wt. % to about 3.0 wt. %, about 1.5 wt. % to about 3.0 wt. %, about 1.8 wt. % to about 3.0 wt. %, about 2.0 wt. % to about 3.0 wt. %, about 2.2 wt. % to about 3.0 wt. %, about 2.2 wt. % to about 2.5 wt. %, about 0.1 wt. % to about 2.5 wt. %, about 0.2 wt. % to about 2.5 wt. %, about 0.3 wt. % to about 2.5 wt. %, about 0.4 wt. % to about 2.5 wt. %, about 0.5 wt. % to about 2.5 wt. %, about 0.6 wt. % to about 2.5 wt. %, about 0.7 wt. % to about 2.5 wt. %, about 0.8 wt. % to about 2.5 wt. %, about 0.9 wt. % to about 2.5 wt. %, about 1.0 wt. % to about 2.5 wt. %, about 1.2 wt. % to about 2.5 wt. %, about 1.5 wt. % to about 2.5 wt. %, about 1.8 wt. % to about 2.5 wt. %, about 2.0 wt. % to about 2.5 wt. %, or any range or value therein.

In some embodiments, the abrasive particles (e.g., colloidal silica or anionically-modified colloidal silica) have a negative charge under pH conditions used in the polishing compositions of the present disclosure. In some embodiments, the abrasive particles (e.g., colloidal silica or anionically-modified colloidal silica) have a negative charge under pH of the polishing composition (e.g., between 6.5 and 11, or between 7 and 11). In some embodiments, the zeta potential of the abrasive particles is equal to or more negative than −1 mV, −2 mV, −5 mV, −10 mV, −15 mV, −20 mV, −25 mV, −30 mV, −35 mV, or −40 mV, or any range or value therein between. In some embodiments, under pH of the polishing composition (e.g., between 6.5 and 11, or between 7 and 11), the zeta potential of the abrasive particles is −40 mV to −5 mV, −40 mV to −10 mV, −40 mV to −15 mV, −40 mV to −20 mV, −40 mV to −25 mV, or −40 mV to −35 mV. In some embodiments, the zeta potential of the anionically-modified abrasive particles is a greater negative charge (i.e., is more negative) than a corresponding unmodified abrasive particle (e.g., unmodified colloidal silica) at the same pH conditions.

In some embodiments, the abrasive particles substantially comprise colloidal silica. As used herein, "substantially" means that greater than or equal to 95 wt. %, preferably greater than or equal to 98 wt. %, more preferably greater than or equal to 99 wt. % of the particles constituting the abrasive are colloidal silica, which includes 100 wt. % of the particles being colloidal silica. In some embodiments, an organic acid is immobilized on the surface of the colloidal silica. In some embodiments, sulfonic acid is immobilized on the surface of the colloidal silica.

The silanol group density of the abrasive particles can vary. In the present specification, the unit "group/$nm^2$" can also be denoted as "$nm^2$."

The average silanol group density on the surface of the abrasive particles is less than or equal to 6.7 $nm^2$, less than or equal to 6.6 $nm^2$, less than or equal to 6.5 $nm^2$, less than or equal to 6.4 $nm^2$, less than or equal to 6.3 $nm^2$, less than or equal to 6.2 $nm^2$, less than or equal to 6.1 $nm^2$, less than or equal to 6.0 $nm^2$, less than or equal to 5.9 $nm^2$, or less than or equal to 5.8 $nm^2$. The average silanol group density on the surface of the abrasive particles is greater than or equal to 1.0 $nm^2$, greater than or equal to 2.0 $nm^2$, greater than or equal to 3.0 $nm^2$, greater than or equal to 4.0 $nm^2$, greater than or equal to 5.0 $nm^2$, greater than or equal to 5.2 $nm^2$, greater than or equal to 5.4 $nm^2$, greater than or equal to 5.6 $nm^2$ greater than or equal to 5.8 $nm^2$, or greater than or equal to 6.0 $nm^2$.

The lower limit of the average silanol group density is generally 0.

The number of silanol groups per unit surface area of the abrasive particles can be calculated by the Sears method, which uses the neutralization titration described in "Determination of Specific Surface Area of Colloidal Silica by Titration with Sodium Hydroxide" by G. W. Sears, Analytical Chemistry, 1956, Vol. 28 (No. 12), pp. 1982-1983. The number of silanol groups is calculated by the following math formula:

$$\rho = (c \times a \times N_A)/(C \times S)$$

ρ: Number of silanol groups [group/$nm^2$]

c: Concentration of aqueous sodium hydroxide solution used for titration [mol/L]

a: Volume of aqueous sodium hydroxide solution with a pH of 4 to 9 to be added dropwise [ml]

$N_A$: Avogadro's number ($6.022\times10^{23}$ [units/mol])

C: Mass of abrasive particles (silica) [g]

S: BET specific surface area [$nm^2$/g]

The number of silanol groups per unit surface area of the abrasive particles can be controlled by selecting the method for producing the abrasive grains and the like.

Surfactants

Anionic (e.g., Phosphate) Surfactant

In some embodiments, the polishing compositions according to the present disclosure comprise one or more anionic surfactants, (e.g., phosphate surfactants). By way of non-limiting example, in some embodiments, the anionic surfactant comprises a polyoxyethylene alkyl ether phosphate or a polyoxyethylene alkenyl ether phosphate. In some embodiments, the polyoxyethylene alkyl ether phosphate may comprise a monoester phosphate, diester phosphate, or mixture of the two. In some embodiments, the polyoxyethylene alkyl ether phosphate has the following structure: [(alkyl chain)-(polyethylene oxide)-O]m-phosphoric acid, wherein m is 1 or 2 or 3. In some embodiments the polyoxyethylene alkyl ether phosphate has the following formula (I):

$$[\text{tail-}(OC_2H_5)_n\text{—}O]_m\text{—}PO_qH_r \quad (I),$$

wherein ($OC_2H_5$) is an "EO group," and n is 1, 2, 3, 4 5, 6, 7, 8, 9, 10, 11, 12, 13, 14, 15, or 16. In some embodiments, the number of EO groups is 10 or less. In some embodiments, m is 1, 2, or 3. In some embodiments, r is 0, 1, or 2. In some embodiments, q is 1, 2, or 3.

In some embodiments, the phosphate surfactant comprises a polyoxyethylene alkyl phenyl ether phosphate. In some embodiments, the phosphate surfactant comprises a polyoxyethylene alkylphenyl ether phosphate having 5 to 16 oxyethylene units. In some embodiments, the phosphate surfactant comprises a polyoxyethylene alkylphenyl ether phosphate having 1 to 15, 2 to 14, 3 to 13, 4 to 12, 5 to 11, 6 to 10, or 6 to 9 oxyethylene units. In some embodiments, the number of carbon atoms of the alkyl in the polyoxyethylene alkylphenyl ether phosphate is 4 to 18, 5 to 17, 6 to 16, 7 to 15, 8 to 14, 8 to 13, 8 to 12, or 8 to 11.

In some embodiments, (m, q, r) is (1, 3, 2), (2, 2, 1), or (3, 1, 0). In some embodiments, n is independently in each instance selected from the group of 1, 2, 3, 4, 5, 6, 7, 8, or 9. In some embodiments, (m, q, r) is (1, 3, 2). In some embodiments, (m, q, r) is (2, 2, 1). In some embodiments, (m, q, r) is (3, 1, 0). In some embodiments, and (m, q, r) is a mixture of (1, 3, 2), (2, 2, 1), and (3, 1, 0).

In some embodiments, the tail comprises a substituted or unsubstituted straight chain or branched alkyl, alkenyl, alkynyl, phenyl, or alkylphenyl $C_{2\text{-}24}$ hydrocarbon. In some embodiments, the alkyl tail comprises a phenyl group (styrenated phenyl or nonyl phenyl). In some embodiments, the tail comprises a hydrocarbon with at least 2, at least 3, at least 4, at least 5, at least 6, at least 7, at least 8, at least 9, at least 10, at least 11, at least 12, at least 13, at least 14, at least 15, at least 16, at least 17, at least 18, at least 19, at least 20, at least 21, at least 22, at least 23, at least 24, or greater number of carbon atoms.

In some embodiments, the phosphate surfactant has 15 or less oxyethylene units and a straight chain or branched $C_4$ or more alkylphenyl, and is present at a concentration of less than 0.5 wt. %, relative to the total weight of the polishing composition.

In some embodiments, the number of oxyethylene units is 1, 2, 3, 4, 5, 6, 7, 8, 9, 10, 11, 12, 13, 14, or 15. In some embodiments, the number of oxyethylene units is 4, 5, 6, 7, 8, 9, 10, 11, 12, 13, 14, or 15.

In some embodiments, the alkyl in the alkylphenyl is straight chain or branched $C_4$ or more, $C_5$ or more, $C_6$ or more, $C_7$ or more, $C_8$ or more, $C_9$ or more, $C_{10}$ or more, or $C_{11}$ or more. In some embodiments, the alkyl in the alkylphenyl is straight chain or branched $C_{18}$ or less, $C_{17}$ or less, $C_{16}$ or less, $C_{15}$ or less, $C_{14}$ or less, $C_{13}$ or less, $C_{12}$ or less, $C_{11}$ or less, or $C_{10}$ or less.

In some embodiments, the phosphate surfactant is represented by the following formula (I):

$$[\text{tail-}(OC_2H_5)_n\text{—}O]_m\text{—}PO_qH_r \quad (I),$$

wherein n is 1, 2, 3, 4, 5, 6, 7, 8, 9, 10, 11, 12, 13, 14, or 15; (m, q, r) is (1, 3, 2), (2, 2, 1), or (3, 1, 0); and the tail is a $C_4$ or more alkylphenyl. In some embodiments, the tail is a $C_7$ or more, $C_8$ or more, $C_9$ or more, $C_{10}$ or more, or $C_{11}$ or more alkylphenyl. In some embodiments, the tail is a $C_{18}$ or less, $C_{17}$ or less, $C_{16}$ or less, Cis or less, $C_{14}$ or less, $C_{13}$ or less, $C_{12}$ or less, $C_{11}$ or less, or $C_{10}$ or less alkylphenyl.

In some embodiments, the tail is a $C_5$ to $C_{11}$ alkylphenyl. In some embodiments, n is, 3, 4, 5, 6, 7, 8, 9, 10, 11, 12, 13, 14, or 15. In some embodiments, n is 6, 7, 8, or 9.

In some embodiments, greater than or equal to 80 wt. %, greater than or equal to 85 wt. %, greater than or equal to 90 wt. %, greater than or equal to 95 wt. %, or greater than or equal to 99 wt. % of the surfactant present in the polishing composition is composed of a phosphate surfactant represented by the formula (I).

In some embodiments, that the phosphate surfactant has a molecular weight of greater than or equal to about 150 g/mol, greater than or equal to about 200 g/mol, greater than or equal to about 250 g/mol, greater than or equal to about 300 g/mol, greater than or equal to about 350 g/mol, greater than or equal to about 400 g/mol, greater than or equal to about 450 g/mol, greater than or equal to about 500 g/mol, greater than or equal to about 550 g/mol, greater than or equal to about 600 g/mol, greater than or equal to about 650 g/mol, greater than or equal to about 700 g/mol, greater than or equal to about 750 g/mol, greater than or equal to about 800 g/mol, greater than or equal to about 850 g/mol, greater than or equal to about 900 g/mol, greater than or equal to about 950 g/mol, greater than or equal to about 1000 g/mol, greater than or equal to about 1100 g/mol, greater than or equal to about 1200 g/mol, greater than or equal to about 1300 g/mol, greater than or equal to about 1400 g/mol, greater than or equal to about 1500 g/mol, or any range or value therein between.

In some embodiments, the phosphate surfactant comprises at least one of laureth-4 phosphate (e.g., Ethfac 142W), polyoxyethylene (5) nonylphenylphosphate, polyoxyethylene (7) nonyl phenyl phosphate (e.g., Ethfac NP-110), polyoxyethylene (10) nonylphenylphosphate, polyoxyethylene (12) nonylphenylphosphate, polyoxyethylene (16) nonylphenylphosphate, polyoxyethylene (7) phenylphosphate, polyoxyethylene (7) dodecylphenylphosphate, polyoxyethylene (7) nonylphosphate, polyoxyethylene (7) propylphenylphosphate, and polyoxyethylene (10) oleyl ether phosphate (e.g., Crodafos O10A), and combinations thereof. In some embodiments, the phosphate surfactant comprises polyoxyethylene (7) nonylphenylphosphate (e.g., Ethfac NP-110) or polyoxyethylene (10) nonylphenylphosphate. In some embodiments, the phosphate surfactant comprises polyoxyethylene (7) nonylphenylphosphate (e.g., Ethfac NP-110).

In some embodiments, the anionic surfactant (e.g., phosphate surfactant) is present in the composition at a concentration by weight, relative to the total weight of the polishing composition, of greater than or equal to about 0.001 wt. %, greater than or equal to about 0.002 wt. %, greater than or equal to about 0.003 wt. %, greater than or equal to about 0.004 wt. %, greater than or equal to about 0.005 wt. %, greater than or equal to about 0.006 wt. %, greater than or equal to about 0.007 wt. %, greater than or equal to about 0.008 wt. %, greater than or equal to about 0.009 wt. %, greater than or equal to about 0.01 wt. %, greater than or equal to about 0.02 wt. %, greater than or equal to about 0.03 wt. %, greater than or equal to about 0.04 wt. %, greater than or equal to about 0.05 wt. %, greater than or equal to about 0.06 wt. %, greater than or equal to about 0.07 wt. %, greater than or equal to about 0.08 wt. %, greater than or equal to about 0.09 wt. %, greater than or equal to about 0.1 wt. %, greater than or equal to about 0.2 wt. %, greater than or equal to about 0.3 wt. %, greater than or equal to about 0.4 wt. %, greater than or equal to about 0.5 wt. %, greater than or equal to about 0.6 wt. %, greater than or equal to about 0.7 wt. %, greater than or equal to about 0.8 wt. %, greater than or equal to about 0.9 wt. %, greater than or equal to about 1.0 wt. %, or any range or value therein between. In some embodiments, the anionic surfactant (e.g., phosphate surfactant) is present at a concentration of greater than 0.01 wt. % and less than 0.1 wt. %, relative to the total weight of the polishing composition.

In some embodiments, the anionic surfactant (e.g., phosphate surfactant) is present in the composition at a concentration by weight, relative to the total weight of the polishing composition, of less than or equal to about 1.0 wt. %, less than or equal to about 0.9 wt. %, less than or equal to about 0.8 wt. %, less than or equal to about 0.7 wt. %, less than or equal to about 0.6 wt. %, less than or equal to about 0.5 wt. %, less than or equal to about 0.4 wt. %, less than or equal to about 0.3 wt. %, less than or equal to about 0.2 wt. %, less than or equal to about 0.1 wt. %, less than or equal to about 0.09 wt. %, less than or equal to about 0.08 wt. %, less than or equal to about 0.07 wt. %, less than or equal to about 0.06 wt. %, less than or equal to about 0.05 wt. %, less than or equal to about 0.04 wt. %, less than or equal to about 0.03 wt. %, less than or equal to about 0.02 wt. %, less than or equal to about 0.01 wt. %, less than or equal to about 0.009 wt. %, less than or equal to about 0.008 wt. %, less than or equal to about 0.007 wt. %, less than or equal to about 0.006 wt. %, less than or equal to about 0.005 wt. %, or any range or value therein between. In some embodiments, the anionic surfactant (e.g., phosphate surfactant) is present at a concentration of greater than 0.01 wt. % and less than 0.1 wt. %, relative to the total weight of the polishing composition.

In some embodiments, the anionic surfactant (e.g., phosphate surfactant) is present in the composition at a concentration by weight, relative to the total weight of the polishing composition, of about 0.001 wt. % to about 1.0 wt. %, about 0.002 wt. % to about 1.0 wt. %, about 0.003 wt. % to about 1.0 wt. %, about 0.004 wt. % to about 1.0 wt. %, about 0.005 wt. % to about 1.0 wt. %, about 0.006 wt. % to about 1.0 wt. %, about 0.007 wt. % to about 1.0 wt. %, about 0.008 wt. % to about 1.0 wt. %, about 0.009 wt. % to about 1.0 wt. %, about 0.01 wt. % to about 1.0 wt. %, about 0.02 wt. % to about 1.0 wt. %, about 0.03 wt. % to about 1.0 wt. %, about 0.04 wt. % to about 1.0 wt. %, about 0.05 wt. % to about 1.0 wt. %, about 0.06 wt. % to about 1.0 wt. %, about 0.07 wt. % to about 1.0 wt. %, about 0.08 wt. % to about 1.0 wt. %, about 0.09 wt. % to about 1.0 wt. %, about 0.1 wt. % to about 1.0 wt. %, 0.001 wt. % to about 0.5 wt. %, about 0.002 wt. % to about 0.5 wt. %, about 0.003 wt. % to about 0.5 wt. %, about 0.004 wt. % to about 0.5 wt. %, about 0.005 wt. % to about 0.5 wt. %, about 0.006 wt. % to about 0.5 wt. %, about 0.007 wt. % to about 0.5 wt. %, about 0.008 wt. % to about 0.5 wt. %, about 0.009 wt. % to about 0.5 wt. %, about 0.01 wt. % to about 0.5 wt. %, about 0.02 wt. % to about 0.5 wt. %, about 0.03 wt. % to about 0.5 wt. %, about 0.04 wt. % to about 0.5 wt. %, about 0.05 wt. % to about 0.5 wt. %, about 0.06 wt. % to about 0.5 wt. %, about 0.07 wt. % to about 0.5 wt. %, about 0.08 wt. % to about 0.5 wt. %, about 0.09 wt. % to about 0.5 wt. %, about 0.1 wt. % to about 0.5 wt. %, 0.001 wt. % to about 0.3 wt. %, about 0.002 wt. % to about 0.3 wt. %, about 0.003 wt. % to about 0.3 wt. %, about 0.004 wt. % to about 0.3 wt. %, about 0.005 wt. % to about 0.3 wt. %, about 0.006 wt. % to about 0.3 wt. %, about 0.007 wt. % to about 0.3 wt. %, about 0.008 wt. % to about 0.3 wt. %, about 0.009 wt. % to about 0.3 wt. %, about 0.01 wt. % to about 0.3 wt. %, about 0.02 wt. % to about 0.3 wt. %, about 0.03 wt. % to about 0.3 wt. %, about 0.04 wt. % to about 0.3 wt. %, about 0.05 wt. % to about 0.3 wt. %, about 0.06 wt. % to about 0.3 wt. %, about 0.07 wt. % to about 0.3 wt. %, about 0.08 wt. % to about 0.3 wt. %, about 0.09 wt. % to about 0.3 wt. %, about 0.1 wt. % to about 0.3 wt. %, or any range or value therein between.

Additional Surfactants

In some embodiments, polishing compositions according to the present disclosure may comprise one or more surfactants according to the following formula (II):

(II)

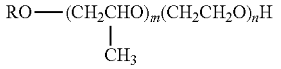

where m is % propylene oxide (PO) by weight, and is 20% to 60% by weight of the total PO and EO units, n is % ethylene oxide (EO) by weight, and is 40% to 80% by weight of the total PO and EO units, R is a $C_{2-7}$ alkyl, and a weight ratio of EO to PO (EO:PO) is 2:3 to 4:1.

In some embodiments, m is about 20%, 25%, 30%, 35%, 40%, 45%, 50%, 55%, or 60% by weight (or ranges thereinbetween) of the total PO and EO units in the surfactant of formula (II). In some embodiments, the number of EO units in the surfactant is about 1, 2, 3, 4, 5, 6, 7, 8 9, 10, 12, 15, 18, 20, 22, 25, 28, 30, 32, 35, 38, 40, 42, 45, 48, or 50. In some embodiments, n is about 40%, 45%, 50%, 55%, 60%, 65%, 70%, 75%, or 80% by weight (or ranges thereinbetween) of the total PO and EO units in the surfactant of formula (II). In some embodiments, the number of PO units in the surfactant is about 1, 2, 3, 4, 5, 6, 7, 8 9, 10, 12, 15, 18, 20, 22, 25, 28, 30, 32, 35, 38, 40, 42, 45, 48, or 50. In some embodiments, the weight ratio of EO to PO (EO:PO) is 2:3, 1:1, 4:3, 5:3, 2:1, 7:3, 8:3, 3:1, 10:3, 11:3, or 4:1, or ranges thereinbetween. In some embodiments, R is a $C_2$, $C_3$, $C_4$, $C_5$, $C_6$, or $C_7$ alkyl, which may be branched or linear, and may be optionally substituted. In some embodiment, the surfactant of formula (II) comprises a polyalkylene glycol monobutyl ether (e.g., UCON-50-400, UCON-50-2000, or any of the similar compounds disclosed in U.S. Pat. No. 11,001,733, which is hereby incorporated by reference in its entirety).

In some embodiments, the surfactant of formula (II) has a molecular weight of greater than or equal to about 1000 g/mol, greater than or equal to about 1100 g/mol, greater than or equal to about 1200 g/mol, greater than or equal to about 1300 g/mol, greater than or equal to about 1400 g/mol, greater than or equal to about 1500 g/mol, greater than or equal to about 1600 g/mol, greater than or equal to about 1700 g/mol, greater than or equal to about 1800 g/mol, greater than or equal to about 1900 g/mol, greater than or equal to about 2000 g/mol, greater than or equal to about 2100 g/mol, greater than or equal to about 2200 g/mol, greater than or equal to about 2300 g/mol, greater than or equal to about 2400 g/mol, greater than or equal to about 2500 g/mol, greater than or equal to about 2600 g/mol, greater than or equal to about 2700 g/mol, greater than or equal to about 2800 g/mol, greater than or equal to about 2900 g/mol, greater than or equal to about 3000 g/mol, greater than or equal to about 3500 g/mol, greater than or equal to about 4000 g/mol, greater than or equal to about 4500 g/mol, greater than or equal to about 5000 g/mol, greater than or equal to about 5500 g/mol, greater than or equal to about 6000 g/mol, greater than or equal to about 6500 g/mol, or greater than or equal to about 7000 g/mol, or any range or value therein between.

In some embodiments, the surfactant of formula (II) has a molecular weight of greater than about 1000 g/mol, 1100 g/mol, about 1200 g/mol, about 1300 g/mol, about 1400 g/mol, about 1500 g/mol, about 1600 g/mol, about 1700 g/mol, about 1800 g/mol, about 1900 g/mol, about 2000 g/mol, about 2100 g/mol, about 2200 g/mol, about 2300 g/mol, about 2400 g/mol, about 2500 g/mol, about 2600 g/mol, about 2700 g/mol, about 2800 g/mol, about 2900 g/mol, about 3000 g/mol, about 3500 g/mol, about 4000 g/mol, about 4500 g/mol, about 5000 g/mol, about 5500 g/mol, about 6000 g/mol, about 6500 g/mol, about or 7000.

In some embodiments, the surfactant of formula (II) is present in the composition at a concentration by weight, relative to the total weight of the polishing composition, of about 0.01 wt. % to about 1 wt. %, about 0.05 wt. % to about 1 wt. %, about 0.1 wt. % to about 1 wt. %, about 0.05 wt. % to about 0.1 wt. %, or 0.05 wt. % to about 0.5 wt. %. In some embodiments, the surfactant of formula (II) is present at a concentration by weight, relative to the total weight of the polishing composition, of greater than or equal to about 0.01 wt. %, greater than or equal to about 0.02 wt. %, greater than or equal to about 0.03 wt. %, greater than or equal to about 0.04 wt. %, greater than or equal to about 0.05 wt. %, greater than or equal to about 0.06 wt. %, greater than or equal to about 0.07 wt. %, greater than or equal to about 0.08 wt. %, greater than or equal to about 0.09 wt. %, greater than or equal to about 0.1 wt. %, greater than or equal to about 0.2 wt. %, greater than or equal to about 0.3 wt. %, greater than or equal to about 0.4 wt. %, greater than or equal to about 0.5 wt. %, greater than or equal to about 0.6 wt. %, greater than or equal to about 0.7 wt. %, greater than or equal to about 0.8 wt. %, greater than or equal to about 0.9 wt. %, greater than or equal to about 1.0 wt. %, or any range or value therein between.

Corrosion Inhibitor

The corrosion inhibitor is also simply referred to as an inhibitor.

In some embodiments, a polishing composition according to the present disclosure comprises a corrosion inhibitor (e.g., a Cu corrosion inhibitor). Without being bound by any particular theory, it is contemplated that the corrosion inhibitor passivates a metal surface (e.g., Cu surface) to prevent pitting and other types of corrosion defects during CMP. By way of non-limiting example, in some embodiments, the inhibitor may comprise one or more of the following: benzotriazole (BTA), 1,2,4-triazole, tetrazole, tolyltriazole, 4-carboxybenzotriazole, 5-carboxybenzotriale, mercaptobenzoxazole, 2-mercaptobenzothiazole, 2-mercaptobenzimidazole, and derivatives thereof. In some embodiments, the inhibitor comprises benzotriazole (BTA).

The concentration of the corrosion inhibitor may be any suitable concentration to prevent corrosion, pitting, or etching of a metal, e.g., Cu, at the pH of the polishing composition. In some embodiments, the inhibitor is present in the polishing composition at a concentration, relative to the total weight of the polishing composition, of greater than or equal to about 0.001 wt. %, greater than or equal to about 0.002 wt. %, greater than or equal to about 0.003 wt. %, greater than or equal to about 0.004 wt. %, greater than or equal to about 0.005 wt. %, greater than or equal to about 0.006 wt. %, greater than or equal to about 0.007 wt. %, greater than or equal to about 0.008 wt. %, greater than or equal to about 0.009 wt. %, greater than or equal to about 0.01 wt. %, greater than or equal to about 0.02 wt. %, greater than or equal to about 0.03 wt. %, greater than or equal to about 0.04 wt. %, greater than or equal to about 0.05 wt. %, greater than or equal to about 0.06 wt. %, greater than or equal to about 0.07 wt. %, greater than or equal to about 0.08 wt. %, greater than or equal to about 0.09 wt. %, greater than or equal to about 0.1 wt. %, greater than or equal to about 0.2 wt. %, greater than or equal to about 0.3 wt. %, greater than or equal to about 0.4 wt. %, greater than or equal to about 0.5 wt. %, greater than or equal to about 0.6 wt. %, greater than or equal to about 0.7 wt. %, greater than or equal to about 0.8 wt. %, greater than or equal to about 0.9 wt. %, greater than or equal to about 1 wt. %.

In some embodiments, the inhibitor is present in the polishing composition at a concentration, relative to the total weight of the polishing composition, of less than or equal to about 1 wt. %, less than or equal to about 0.9 wt. %, less than or equal to about 0.8 wt. %, less than or equal to about 0.7 wt. %, less than or equal to about 0.6 wt. %, less than or equal to about 0.5 wt. %, less than or equal to about 0.4 wt. %, less than or equal to about 0.3 wt. %, less than or equal to about 0.2 wt. %, less than or equal to about 0.1 wt. %, less than or equal to about 0.09 wt. %, less than or equal to about 0.08 wt. %, less than or equal to about 0.07 wt. %, less than or equal to about 0.06 wt. %, less than or equal to about 0.05 wt. %, less than or equal to about 0.04 wt. %, less than or equal to about 0.03 wt. %, less than or equal to about 0.02 wt. %, less than or equal to about 0.01 wt. %, or any range or value therein between.

In some embodiments, the inhibitor is present in the polishing composition at a concentration, relative to the total weight of the polishing composition, of about 0.001 wt. % to about 1 wt. %, about 0.002 wt. % to about 1 wt. %, about 0.003 wt. % to about 1 wt. %, about 0.004 wt. % to about 1 wt. %, about 0.005 wt. % to about 1 wt. %, about 0.006 wt. % to about 1 wt. %, about 0.007 wt. % to about 1 wt. %, about 0.008 wt. % to about 1 wt. %, about 0.009 wt. % to about 1 wt. %, about 0.01 wt. % to about 1 wt. %, about 0.02 wt. % to about 1 wt. %, about 0.03 wt. % to about 1 wt. %, about 0.04 wt. % to about 1 wt. %, about 0.05 wt. % to about 1 wt. %, about 0.06 wt. % to about 1 wt. %, about 0.07 wt. % to about 1 wt. %, about 0.08 wt. % to about 1 wt. %, about 0.09 wt. % to about 1 wt. %, about 0.1 wt. % to about 1 wt. %, about 0.2 wt. % to about 1 wt. %, about 0.3 wt. % to about 1 wt. %, about 0.4 wt. % to about 1 wt. %, about 0.5 wt. % to about 1 wt. %, 0.001 wt. % to about 0.5 wt. %, about 0.002 wt. % to about 0.5 wt. %, about 0.003 wt. % to about 0.5 wt. %, about 0.004 wt. % to about 0.5 wt. %, about 0.005 wt. % to about 0.5 wt. %, about 0.006 wt. % to about 0.5 wt. %, about 0.007 wt. % to about 0.5 wt. %, about 0.008 wt. % to about 0.5 wt. %, about 0.009 wt. % to about 0.5 wt. %, about 0.01 wt. % to about 0.5 wt. %, about 0.02 wt. % to about 0.5 wt. %, about 0.03 wt. % to about 0.5 wt. %, about 0.04 wt. % to about 0.5 wt. %, about 0.05 wt. % to about 0.5 wt. %, about 0.06 wt. % to about 0.5 wt. %, about 0.07 wt. % to about 0.5 wt. %, about 0.08 wt. % to about 0.5 wt. %, about 0.09 wt. % to about 0.5 wt. %, about 0.1 wt. % to about 0.5 wt. %, about 0.2 wt. % to about 0.5 wt. %, about 0.3 wt. % to about 0.5 wt. %, about 0.001 wt. % to about 0.2 wt. %, about 0.002 wt. % to about 0.2 wt. %, about 0.003 wt. % to about 0.2 wt. %, about 0.004 wt. % to about 0.2 wt. %, about 0.005 wt. % to about 0.2 wt. %, about 0.006 wt. % to about 0.2 wt. %, about 0.007 wt. % to about 0.2 wt. %, about 0.008 wt. % to about 0.2 wt. %, about 0.009 wt. % to about 0.2 wt. %, about 0.01 wt. % to about 0.2 wt. %, about 0.02 wt. % to about 0.2 wt. %, about 0.03 wt. % to about 0.2 wt. %, about 0.04 wt. % to about 0.2 wt. %, about 0.05 wt. % to about 0.2 wt. %, about 0.06 wt. % to about 0.2 wt. %, about 0.07 wt. % to about 0.2 wt. %, about 0.08 wt. % to about 0.2 wt. %, about 0.09 wt. % to about 0.2 wt. %, about 0.1 wt. % to about 0.2 wt. %, about 0.001 wt. % to about 0.1 wt. %, about 0.002 wt. % to about 0.1 wt. %, about 0.003 wt. % to about 0.1 wt. %, about 0.004 wt. % to about 0.1 wt. %, about 0.005 wt. % to about 0.1 wt. %, about 0.006 wt. % to about 0.1 wt. %, about 0.007 wt. % to about 0.1 wt. %, about 0.008 wt. % to about 0.1 wt. %, about 0.009 wt. % to about 0.1 wt. %, about 0.01 wt. % to about 0.1 wt. %, about 0.02 wt. % to about 0.1 wt. %, about 0.03 wt. % to about 0.1 wt. %, about 0.04 wt. % to about 0.1 wt. %, about 0.05 wt. % to about 0.1 wt. %, or any range or value therein between.

Water-Soluble Polymer

In some embodiments, the polishing composition according to the present disclosure comprises one or more water-soluble polymers. In some embodiments, the water-soluble polymer is in solid form (powder form) at 25° C. and can be dissolved in water, thereby becoming liquid. The water-soluble polymer-containing solution can be prepared by dissolving the water-soluble polymer in water. Here, "water-soluble" means that the solubility in water (25° C.) is 1 g/100 mL or more, and a "polymer" refers to a (co)polymer having repeating units in its molecular structure and a weight average molecular weight (Mw) of 1,000 or more. In the present specification, the value of the weight average molecular weight (in terms of polyethylene glycol) measured by gel permeation chromatography (GPC) can be used as the "weight average molecular weight." The weight average molecular weight can be measured by the following apparatus and conditions:

GPC system: manufactured by Shimadzu Corporation
Model: Prominence+ELSD detector (ELSD-LTII)
Column: VP-ODS (manufactured by Shimadzu Corporation)
Mobile phase A: MeOH
B: acetic acid 1% aqueous solution
Flow rate: 1 mL/min
Detector: ELSD temp. 40° C., Gain 8, N2GAS 350 kPa
Oven temperature: 40° C.
Injection volume: 40 μL.

In some embodiments, the weight average molecular weight of the water-soluble polymer (e.g., pullulan) is, for example, 1,000 to 1,000,000, 10,000 to 700,000, 100,000 to 600,000, or 200,000 to 500,000, but is not limited thereto. In some embodiments, the kinematic viscosity of the aqueous solution of the water-soluble polymer (e.g., pullulan), in which the water-soluble polymer is dissolved in deionized water (converted to a concentration of 10% (w/w)), as measured by the Ubbelohde viscometer method (measurement temperature: 30° C.), is, for example, 100 to 180 $mm^2/s$.

The one or more water-soluble polymers is not particularly limited. Non-limiting examples of the water soluble polymer include one or more polysaccharides (e.g., alginic acid, pectic acid, agar, curdlan and pullulan); cellulose derivatives (e.g., hydroxymethyl cellulose, hydroxyethyl cellulose (HEC), hydroxypropyl cellulose, hydroxyethylmethyl cellulose, hydroxypropylmethyl cellulose, methyl cellulose, ethyl cellulose, ethylhydroxyethyl cellulose, or carboxymethyl cellulose; an imine derivative such as poly(N-acylalkyleneimine); polyvinyl alcohol (PVA); modified (cation modified or non-ion modified) polyvinyl alcohol; poly(N-vinylacetamide) (PNVA); polyvinyl pyrrolidone (PVP); polyvinylcaprolactam; polyoxyalkylenes (e.g., polyoxyethylene); polypropylene glycol (PPG), polyethylene glycol (PEG), PEG-PPG copolymers or block copolymers (e.g., PEG-PPG, PEG-PPG-PEG, PPG-PEG-PPG, etc.), and a copolymers or mixtures thereof. In some embodiments, the water-soluble polymer comprises pullulan. The one or more water-soluble polymers may be used alone or as a mixture of two or more kinds.

In some embodiments, the water-soluble polymer comprised in the polishing composition according to the present disclosure comprises a polysaccharide. In some embodiments, the water-soluble polymer comprised in the polishing composition according to the present disclosure comprises a polysaccharide consisting solely of glucose. In some embodiments, the water-soluble polymer comprised in the polishing composition according to the present disclosure comprises pullulan. In some embodiments, greater than or equal to 80 wt. %, greater than or equal to 85 wt. %, greater than or equal to 90 wt. %, greater than or equal to 95 wt. %, or greater than or equal to 99 wt. % of the water-soluble polymer comprised in the polishing composition according to the present disclosure is composed of a polysaccharide. Here, polysaccharide is a general term for the substances in which a large number of monosaccharide molecules are polymerized by glycosidic bonds. The concept of polysaccharide includes saccharides in which a plurality of monosaccharides (two or more molecules) are bonded.

In some embodiments, greater than or equal to 80 wt. %, greater than or equal to 85 wt. %, greater than or equal to 90 wt. %, greater than or equal to 95 wt. %, or greater than or equal to 99 wt. % of the water-soluble polymer comprised in the polishing composition according to the present disclosure is composed of a polysaccharide consisting solely of glucose (e.g., pullulan).

In some embodiments, the water-soluble polymer has a molecular weight of greater than or equal to about 500 g/mol, greater than or equal to about 1000 g/mol, greater than or equal to about 1500 g/mol, greater than or equal to about 2000 g/mol, greater than or equal to about 2500 g/mol, greater than or equal to about 3000 g/mol, greater than or equal to about 3500 g/mol, greater than or equal to about 4000 g/mol, greater than or equal to about 4500 g/mol, greater than or equal to about 5000 g/mol, greater than or equal to about 5500 g/mol, greater than or equal to about 6000 g/mol, greater than or equal to about 6500 g/mol, greater than or equal to about 7000 g/mol, greater than or equal to about 7500 g/mol, greater than or equal to about 8000 g/mol, greater than or equal to about 8500 g/mol, greater than or equal to about 9000 g/mol, greater than or equal to about 9500 g/mol, greater than or equal to about 10000 g/mol, greater than or equal to about 15000 g/mol, greater than or equal to about 20000 g/mol, greater than or equal to about 25000 g/mol, greater than or equal to about 30000 g/mol, greater than or equal to about 35000 g/mol, greater than or equal to about 40000 g/mol, greater than or equal to about 45000 g/mol, greater than or equal to about 50000 g/mol, greater than or equal to about 55000 g/mol, greater than or equal to about 60000 g/mol, greater than or equal to about 65000 g/mol, greater than or equal to about 70000 g/mol, greater than or equal to about 75000 g/mol, greater than or equal to about 80000 g/mol, greater than or equal to about 85000 g/mol, greater than or equal to about 90000 g/mol, greater than or equal to about 95000 g/mol, greater than or equal to about 100000 g/mol, greater than or equal to about 150000 g/mol, greater than or equal to about 200000 g/mol, greater than or equal to about 250000 g/mol, greater than or equal to about 300000 g/mol, greater than or equal to about 350000 g/mol, greater than or equal to about 400000 g/mol, greater than or equal to about 450000 g/mol, greater than or equal to about 500000 g/mol, or any range or value therein between (e.g., 5,000 to 300,000 g/mol).

In some embodiments, the one or more water-soluble polymers is present at a concentration, by weight, relative to the total weight of the polishing composition, of about 0.001 wt. % to about 5 wt. %, about 0.01 wt. % to about 0.5 wt. %, about 0.005 wt. % to about 5 wt. %, about 0.01 wt. % to about 5 wt. %, about 0.05 wt. % to about 5 wt. %, about 0.1 wt. % to about 5 wt. %, about 0.5 wt. % to about 5 wt. %, about 1 wt. % to about 5 wt. %, about 0.001 wt. % to about 1 wt. %, about 0.005 wt. % to about 1 wt. %, about 0.01 wt. % to about 1 wt. %, about 0.05 wt. % to about 1 wt. %, about 0.1 wt. % to about 1 wt. %, about 0.5 wt. % to about 1 wt. %, about 0.001 wt. % to about 0.1 wt. %, about 0.005 wt. % to about 0.1 wt. %, about 0.01 wt. % to about 0.1 wt. %, about 0.05 wt. % to about 0.1 wt. %, about 0.001 wt. % to about 0.1 wt. %, or any range or value therein between (e.g. about 0.001 wt. %, about 0.002 wt. %, about 0.003 wt. %, about 0.004 wt. %, about 0.005 wt. %, about 0.006 wt. %, about 0.007 wt. %, about 0.008 wt. %, about 0.009 wt. %, about 0.01 wt. %, about 0.02 wt. %, about 0.03 wt. %, about 0.04 wt. %, about 0.05 wt. %, about 0.06 wt. %, about 0.07 wt. %, about 0.08 wt. %, about 0.09 wt. %, about 0.1 wt. %, about 0.2 wt. %, about 0.3 wt. %, about 0.4 wt. %, about 0.5 wt. %, about 0.6 wt. %, about 0.7 wt. %, about 0.8 wt. %, about 0.9 wt. %, about 1 wt. %, about 2 wt. %, about 3 wt. %, about 4 wt. %, or about 5 wt. %).

In some embodiments, the water-soluble polymer is present in the polishing composition at a concentration of greater than 0.01 wt. %, relative to the total weight of the polishing composition. In some embodiments, the water-soluble polymer is present at a concentration by weight, relative to the total weight of the polishing composition, of less than or equal to 5 wt. %, less than or equal to 4 wt. %, less than or equal to 3 wt. %, less than or equal to 2 wt. %, less than or equal to 1 wt. %, less than or equal to 0.9 wt. %, less than or equal to 0.7 wt. %, less than or equal to 0.5 wt. %, less than or equal to 0.3 wt. %, less than or equal to 0.1 wt. %, or any range or value therein between.

Electronic Conductivity (EC) Controllers

In some embodiments, a polishing composition according to the present disclosure further comprises a salt that functions as an electronic conductivity (EC) controller. The EC controller may be any salt that is suitable for polishing compositions (e.g., for adjusting ionic strength of the composition). For example, in some embodiments, the EC controller is a citrate salt, such as a potassium citrate (e.g., tripotassium citrate). In some embodiments, the EC controller is a nitrate salt, such as sodium nitrate, potassium nitrate, or ammonium nitrate. In some embodiments, the EC controller is an acetate salt, such as sodium acetate, potassium acetate, or ammonium acetate. In some embodiments, the EC controller is a halide salt (e.g., NaCl or KCl). In some embodiments, the EC controller may comprise $KHCO_3$ or $NaHCO_3$. The EC controller may also be in the hydrate form prior to addition. In some embodiments, the electric conductivity controller comprised in the polishing composition according to the present disclosure includes citrate salts. In some embodiments, the salt in the citrate salt is at least one of sodium, potassium, and ammonium.

In some embodiments, one or more EC controllers is present at a concentration, by weight, relative to the total weight of the polishing composition, of about 0.001 wt. % to about 5 wt. %, about 0.005 wt. % to about 5 wt. %, about 0.01 wt. % to about 5 wt. %, about 0.05 wt. % to about 5 wt. %, about 0.1 wt. % to about 5 wt. %, about 0.5 wt. % to about 5 wt. %, about 1 wt. % to about 5 wt. %, about 0.001 wt. % to about 1 wt. %, about 0.005 wt. % to about 1 wt. %, about 0.01 wt. % to about 1 wt. %, about 0.05 wt. % to about 1 wt. %, about 0.1 wt. % to about 1 wt. %, about 0.5 wt. % to about 1 wt. %, about 0.001 wt. % to about 0.1 wt. %, about 0.005 wt. % to about 0.1 wt. %, about 0.01 wt. % to about 0.1 wt. %, about 0.05 wt. % to about 0.1 wt. %, about 0.001 wt. % to about 0.1 wt. %, or any range or value therein between (e.g. about 0.001 wt. %, about 0.002 wt. %, about 0.003 wt. %, about 0.004 wt. %, about 0.005 wt. %, about 0.006 wt. %, about 0.007 wt. %, about 0.008 wt. %, about 0.009 wt. %, about 0.01 wt. %, about 0.02 wt. %, about 0.03 wt. %, about 0.04 wt. %, about 0.05 wt. %, about 0.06 wt. %, about 0.07 wt. %, about 0.08 wt. %, about 0.09 wt. %, about 0.1 wt. %, about 0.2 wt. %, about 0.3 wt. %, about 0.4 wt. %, about 0.5 wt. %, about 0.6 wt. %, about 0.7 wt. %, about 0.8 wt. %, about 0.9 wt. %, about 1 wt. %, about 2 wt. %, about 3 wt. %, about 4 wt. %, or about 5 wt. %).

In some embodiments, one or more EC controllers are present in the polishing composition at a concentration of less than 1 wt. %, relative to the total weight of the polishing composition. In some embodiments, one or more EC controllers are present in the polishing composition at a concentration of less than 0.5 wt. %, relative to the total weight of the polishing composition. In some embodiments, one or more EC controllers are present in the polishing composition at a concentration of greater than 0.03 wt. %, relative to the total weight of the polishing composition. In some embodiments, one or more EC controllers are present in the polishing composition at a concentration by weight, relative to the total weight of the polishing composition, of greater than or equal to 0.001 wt. %, greater than or equal to 0.003 wt. %, greater than or equal to 0.005 wt. %, greater than or equal to 0.007 wt. %, greater than or equal to 0.009 wt. %, greater than or equal to 0.01 wt. %, greater than or equal to 0.03 wt. %, greater than or equal to 0.05 wt. %, greater than or equal to 0.07 wt. %, greater than or equal to 0.09 wt. %, or any range or value therein between. In some embodiments, one or more EC controllers are present in the polishing composition at a concentration by weight, relative to the total weight of the polishing composition, of less than or equal to 0.9 wt. %, less than or equal to 0.8 wt. %, less than or equal to 0.7 wt. %, less than or equal to 0.6 wt. %, less than or equal to 0.5 wt. %, less than or equal to 0.4 wt. %, less than or equal to 0.3 wt. %, less than or equal to 0.2 wt. %, or any range or value therein between.

In some embodiments, the EC controller is a citrate salt, such as tripotassium citrate or ammonium citrate dibasic.

Oxidizers

In some embodiments, the polishing compositions of the present disclosure may comprise at least one oxidizer. An oxidizer may be added to the present polishing composition to oxidize a metal surface (e.g., Cu) of a polishing object, thereby enhancing the metal removal rate of the polishing process. In some embodiments, an oxidizer is added to the polishing composition only immediately prior to use (e.g., at "point of use" or "POU"). In other embodiments, an oxidizer is mixed with other ingredients of the polishing composition at approximately the same time during a manufacturing procedure. In some embodiments, the present composition is manufactured and sold as a stock composition, and an end customer can choose to dilute the stock composition as needed and/or add a suitable amount of an oxidizer before using.

In some embodiments, non-limiting examples of the oxidizer which may be used include, but are not limited to, a peroxide (e.g., hydrogen peroxide, sodium peroxide, barium peroxide, etc.), an organic oxidizer, ozone water, a silver (II) salt, an iron (III) salt, permanganese acid, chromic acid, dichromic acid, peroxodisulfuric acid, peroxophosphoric acid, peroxosulfuric acid, peroxoboric acid, performic acid, peracetic acid, perbenzoic acid, perphthalic acid, hypochlorous acid, hypobromous acid, hypoiodous acid, chloric acid, chlorous acid, perchloric acid, bromic acid, iodic acid, periodic acid, persulfuric acid, dichloroisocyanuric acid, and a salt thereof. The oxidizer may be used either singly or as a mixture of two or more kinds. In some embodiments, the oxidizer comprises, hydrogen peroxide, ammonium persulfate, periodic acid, hypochlorous acid, sodium dichloroisocyanurate, or mixtures thereof. In some embodiments, the oxidant comprises hydrogen peroxide (e.g., 30% $H_2O_2$). In some embodiments, greater than or equal to 80 wt. %, greater than or equal to 85 wt. %, greater than or equal to 90 wt. %, greater than or equal to 95 wt. %, or greater than or equal to 99 wt. % of the oxidizer comprised in the polishing composition of the present disclosure is composed of hydrogen peroxide.

In some embodiments, the one or more oxidizers are present in the composition at a concentration by weight, relative to the total weight of the composition, of greater than or equal to about 0.1 wt. %, greater than or equal to about 0.15 wt. %, greater than or equal to about 0.2 wt. %, greater than or equal to about 0.25 wt. %, greater than or equal to about 0.3 wt. %, greater than or equal to about 0.35 wt. %, greater than or equal to about 0.4 wt. %, greater than or equal to about 0.45 wt. %, greater than or equal to about 0.5 wt. %, greater than or equal to about 0.55 wt. %, greater than or equal to about 0.60 wt. %, greater than or equal to about 0.65 wt. %, greater than or equal to about 0.7 wt. %, greater than or equal to about 0.75 wt. %, greater than or equal to about 0.8 wt. %, greater than or equal to about 0.85 wt. %, greater than or equal to about 0.9 wt. %, greater than or equal to about 0.95 wt. %, greater than or equal to about 1.0 wt. %, greater than or equal to about 1.1 wt. %, greater than or equal to about 1.2 wt. %, greater than or equal to about 1.3 wt. %, greater than or equal to about 1.4 wt. %, greater than or equal to about 1.5 wt. %, greater than or equal to about 1.6 wt. %, greater than or equal to about 1.7 wt. %, greater than or equal to about 1.8 wt. %, greater than or equal to about 1.9 wt. %, greater than or equal to about 2.0 wt. %, greater than or equal to about 2.5 wt. %, greater than or equal to about 3.0 wt. %, greater than or equal to about 3.5 wt. %, greater than or equal to about 4.0 wt. %, greater than or equal to about 4.5 wt. %, greater than or equal to about 5.0 wt. %, greater than or equal to about 5.5 wt. %, greater than or equal to about 6.0 wt. %, greater than or equal to about 6.5 wt. %, greater than or equal to about 7.0 wt. %, greater than or equal to about 7.5 wt. %, greater than or equal to about 8.0 wt. %, greater than or equal to about 8.5 wt. %, greater than or equal to about 9.0 wt. %, greater than or equal to about 9.5 wt. %, greater than or equal to about 10.0 wt. %, or any range or value therein between. In some embodiments, one or more oxidizers are present in the composition at a concentration by weight, relative to the total weight of the composition, of less than or equal to 10 wt. %, less than or equal to 9 wt. %, less than or equal to 8 wt. %, less than or equal to 7 wt. %, less than or equal to 6 wt. %, less than or equal to 5 wt. %, less than or equal to 4 wt. %, less than or equal to 3 wt. %, less than or equal to 2 wt. %, or any range or value therein between.

As the content of the one or more oxidizers decreases, the cost involved with materials of the polishing composition can be saved and a load involved with waste treatment after use of the polishing composition can be reduced. It is also possible to reduce the possibility of excessive oxidation of a surface by reducing the content of an oxidizer.

Acidic Compound

In some embodiments, the polishing composition according to the present disclosure comprises one or more acidic compounds. In some embodiments, the one or more acidic compounds comprises one or more organic acids (e.g., carboxylic acids including formic acid, acetic acid, propionic acid, butyric acid, valeric acid, 2-methylbutyric acid, n-hexanoic acid, 3,3-dimethylbutyric acid, 2-ethylbutyric acid, 4-methylpentanoic acid, n-heptanoic acid, 2-methylhexanoic acid, n-octanoic acid, 2-ethylhexanoic acid, benzoic acid, glycolic acid, salicylic acid, glyceric acid, oxalic acid, malonic acid, succinic acid, glutaric acid, adipic acid, pimelic acid, maleic acid, phthalic acid, malic acid, tartaric acid, citric acid, and lactic acid; organic sulfuric acids including methanesulfonic acid, ethanesulfonic acid, and isethionic acid, and any combinations thereof; and organic phosphonoacetic acids, such as 2-hydroxy phosphonoacetic acid (HPAA); and combinations thereof). In some embodiments, the organic acid is citric acid.

In some embodiments, one or more organic acids is present in the polishing composition at a concentration, by weight relative to the total weight of the polishing composition, of about 0.001 wt. % to about 5 wt. %, about 0.01 wt. % to about 0.5 wt. %, about 0.005 wt. % to about 5 wt. %, about 0.01 wt. % to about 5 wt. %, about 0.05 wt. % to about 5 wt. %, about 0.1 wt. % to about 5 wt. %, about 0.5 wt. % to about 5 wt. %, about 1 wt. % to about 5 wt. %, about 0.001 wt. % to about 1 wt. %, about 0.005 wt. % to about 1 wt. %, about 0.01 wt. % to about 1 wt. %, about 0.05 wt. % to about 1 wt. %, about 0.1 wt. % to about 1 wt. %, about 0.5 wt. % to about 1 wt. %, about 0.001 wt. % to about 0.1 wt. %, about 0.005 wt. % to about 0.1 wt. %, about 0.01 wt. % to about 0.1 wt. %, about 0.05 wt. % to about 0.1 wt. %, about 0.001 wt. % to about 0.1 wt. %, or any range or value therein between (e.g. about 0.001 wt. %, about 0.002 wt. %, about 0.003 wt. %, about 0.004 wt. %, about 0.005 wt. %, about 0.006 wt. %, about 0.007 wt. %, about 0.008 wt. %, about 0.009 wt. %, about 0.01 wt. %, about 0.02 wt. %, about 0.03 wt. %, about 0.04 wt. %, about 0.05 wt. %, about 0.06 wt. %, about 0.07 wt. %, about 0.08 wt. %, about 0.09 wt. %, about 0.1 wt. %, about 0.2 wt. %, about 0.3 wt. %, about 0.4 wt. %, about 0.5 wt. %, about 0.6 wt. %, about 0.7 wt. %, about 0.8 wt. %, about 0.9 wt. %, about 1 wt. %, about 2 wt. %, about 3 wt. %, about 4 wt. %, or about 5 wt. %).

pH Adjusting Agent

In some embodiments, a composition according to the present disclosure may further comprise one or more pH adjusting agents to adjust the pH to a selected pH value. In some embodiments, the "surfactant," "phosphate surfactant," "water-soluble polymer," and "corrosion inhibitor" disclosed above are not considered to be pH adjusting agent(s).

The pH adjusting agent is not particularly limited, and any suitable pH adjusting agent may be used to bring the pH of the composition into any desired range, as discussed above. In some embodiments, the one or more pH adjusting agents may comprise, consist essentially of, or consist of an inorganic compound, an organic compound, or combinations thereof. In some embodiments, the one or more pH adjusting agents may comprise inorganic acids (e.g., hydrochloric acid, hydrobromic acid, hydroiodic acid, sulfuric acid, nitric acid, boric acid, carbonic acid, hypophosphorous acid, phosphorous acid, and phosphoric acid); organic acids (e.g., carboxylic acids such as citric acid, formic acid, acetic acid, propionic acid, benzoic acid, salicylic acid, glyceric acid, oxalic acid, malonic acid, succinic acid, maleic acid, phthalic acid, malic acid, tartaric acid, and lactic acid); and/or organic sulfuric acids (e.g., methane sulfonic acid, ethane sulfonic acid, isethionic acid, etc.). In some embodiments, the one or more pH adjusting agents may comprise a divalent or higher acid of the above acid(s) (e.g., sulfuric acid, carbonic acid, phosphoric acid, oxalic acid, etc.), which may be in the form of a base when one or more protons ($H^+$) can be released (e.g., ammonium hydrogen carbonate or ammonium hydrogen phosphate), but any counter-ion may be used (e.g., weakly basic cations, such as ammonium, triethanolamine, etc.). In some embodiments, the one or more pH adjusting agents comprises nitric acid.

In some embodiments, the one or more pH adjusting agents may comprise one or more hydroxides of alkali metals (e.g., NaOH, KOH), or salts thereof (e.g., carbonates, hydrogen carbonates, sulfates, acetates, etc.); quaternary ammonium compounds (e.g., tetramethylammonium, tetraethylammonium, tetrabutylammonium, etc.); quaternary ammonium hydroxides (e.g., tetramethylammonium hydroxide, tetraethylammonium hydroxide, tetrabutylammonium hydroxide) or a salts thereof; ammonia; amines; or any other suitable pH adjusting agent.

In some embodiments, one or more pH adjusting agents is present in the polishing composition at a concentration, by weight relative to the total weight of the polishing composition, of about 0.001 wt. % to about 5 wt. %, about 0.01 wt. % to about 0.5 wt. %, about 0.005 wt. % to about 5 wt. %, about 0.01 wt. % to about 5 wt. %, about 0.05 wt. % to about 5 wt. %, about 0.1 wt. % to about 5 wt. %, about 0.5 wt. % to about 5 wt. %, about 1 wt. % to about 5 wt. %, about 0.001 wt. % to about 1 wt. %, about 0.005 wt. % to about 1 wt. %, about 0.01 wt. % to about 1 wt. %, about 0.05 wt. % to about 1 wt. %, about 0.1 wt. % to about 1 wt. %, about 0.5 wt. % to about 1 wt. %, about 0.001 wt. % to about 0.1 wt. %, about 0.005 wt. % to about 0.1 wt. %, about 0.01 wt. % to about 0.1 wt. %, about 0.05 wt. % to about 0.1 wt. %, about 0.001 wt. % to about 0.1 wt. %, or any range or value therein between (e.g. about 0.001 wt. %, about 0.002 wt. %, about 0.003 wt. %, about 0.004 wt. %, about 0.005 wt. %, about 0.006 wt. %, about 0.007 wt. %, about 0.008 wt. %, about 0.009 wt. %, about 0.01 wt. %, about 0.02 wt. %, about 0.03 wt. %, about 0.04 wt. %, about 0.05 wt. %, about 0.06 wt. %, about 0.07 wt. %, about 0.08 wt. %, about 0.09 wt. %, about 0.1 wt. %, about 0.2 wt. %, about 0.3 wt. %, about 0.4 wt. %, about 0.5 wt. %, about 0.6 wt. %, about 0.7 wt. %, about 0.8 wt. %, about 0.9 wt. %, about 1 wt. %, about 2 wt. %, about 3 wt. %, about 4 wt. %, or about 5 wt. %).

pH of Polishing Composition

The pH adjust agent may be present in any amount suitable to achieve a desired pH value, as discussed above. In some embodiments, the pH of the composition is basic (e.g., greater than 7). In some embodiments, the pH of the composition is equal to or greater than 7, greater than 7, greater than or equal to 7.1, greater than or equal to 7.2, greater than or equal to 7.3, greater than or equal to 7.4, greater than or equal to 7.5, greater than or equal to 7.6, greater than or equal to 7.7, greater than or equal to 7.8, greater than or equal to 7.9, greater than or equal to 8.0, greater than or equal to 8.1, greater than or equal to 8.2, greater than or equal to 8.3, greater than or equal to 8.4, greater than or equal to 8.5, greater than or equal to 8.6, greater than or equal to 8.7, greater than or equal to 8.8, greater than or equal to 8.9, greater than or equal to 9.0, greater than or equal to 9.1, greater than or equal to 9.2, greater than or equal to 9.3, greater than or equal to 9.4, greater than or equal to 9.5, greater than or equal to 9.6, greater than or equal to 9.7, greater than or equal to 9.8, greater than or equal to 9.9, greater than or equal to 10.0, or any range or value therein between. In some embodiments, the pH of the composition is greater than 8.

In some embodiments, the pH of the composition is less than or equal to about 11.0, less than or equal to about 10.5, less than or equal to about 10.0, less than or equal to about 9.9, less than or equal to about 9.8, less than or equal to about 9.7, less than or equal to about 9.6, less than or equal to about 9.5, less than or equal to about 9.4, less than or equal to about 9.3, less than or equal to about 9.2, less than or equal to about 9.1, less than or equal to about 9.0, less than or equal to about 8.9, less than or equal to about 8.8, less than or equal to about 8.7, less than or equal to about 8.6, less than or equal to about 8.5, less than or equal to about 8.4, less than or equal to about 8.3, less than or equal to about 8.2, less than or equal to about 8.1, less than or equal to about 8.0, less than or equal to about 7.9, less than or equal to about 7.8, less than or equal to about 7.7, less than or equal to about 7.6, less than or equal to about 7.5, or any range or value therein between. In some embodiments, the pH of the composition is less than 11. In some embodiments, the pH of the composition is greater than 8 and less than 10.5.

In some embodiments, the pH of the composition is from 7 to 11, 7 to 10.5, 7 to 10, 7 to 9.5, 7 to 9, 7 to 8.5, 7 to 8, 7.5 to 10, 7.5 to 9.5, 7.5 to 9, 7.5 to 8.5, 7.5 to 8, 8 to 11, 8 to 10.5, 8 to 10, 8 to 9.5, 8 to 9, 8 to 8.5, 8.5 to 11, 8.5 to 10.5, 8.5 to 10, 8.5 to 9.5, 8.5 to 9, 9 to 11, 9 to 10.5, 9 to 10, 9 to 9.5, 9.5 to 11, 9.5 to 10.5, 9.5 to 10, 10 to 11, or any range or value therein between. In some embodiments, the pH of the composition is about 7, about 7.5, about 8, about 8.5, about 9, about 9.5, about 10, about 10.5, about 11, or any range or value therein between. In some embodiments, the pH of the composition is greater than 8 and less than 11.

Other Additives

In some embodiments, the composition may comprise other additives at any concentration. However, it is desirable not to add unnecessary components, which may cause the presence of surface defects. Thus, it is preferred that any other additives are present in relatively small concentrations (e.g., 0.1 wt. % or less, 0.05 wt. % or less, 0.01 wt. % or less, 0.005 wt. % or less, 0.001 wt. % or less, 0.0005 wt. % or less, 0.0001 wt. % or less, 0.0001 wt. % to 0.1 wt. %, 0.0001 wt. % to 0.01 wt. %, or 0.0001 wt. % to 0.001 wt. %, etc.) if they are present at all. Examples of other additives include antiseptic agents, biocides (e.g., isothiazolinones such as methylisothiazolinone ("MIT"), benzisothiazolinone ("BIT"), etc.), dissolved gases, and the like.

Liquid Carrier

Polishing compositions according to the present disclosure comprise a liquid carrier. The liquid carrier of the polishing composition is not particularly limited. In some embodiments, the liquid carrier is water, such as deionized water. The liquid carrier may also be an aqueous solution that has, e.g., an appropriate pH modifier contained therein. In some embodiments, the liquid carrier can comprise one or more organic solvents, such as an alcohol compound, e.g., glycol ethers of aliphatic alcohols and 3 to 10 carbon atoms having 2 to 6 carbon atoms. Examples of aliphatic alcohols with 2 to 6 carbon atoms include ethanol, 1-propanol, 2-propanol, 1-butanol, 2-butanol, tert-butanol, pentanol, hexanol, ethylene glycol, propylene glycol, 1,3-butanediol, 1,4-butanediol, 1,5-pentanediol, 1,6-hexanediol, glycerin, 1,2,4-butanetriol, 1,2,6-hexanetriol, erythritol, D-threitol, L-threitol, D-arabinitol, L-arabinitol, ribitol, xylitol, mannitol, and sorbitol. Examples of glycol ethers with 3 to 10 carbon atoms include methyl glycol, methyl diglycol, methyl triglycol, isopropyl glycol, isopropyl diglycol, butyl glycol, butyl diglycol, butyl triglycol, isobutyl glycol, isobutyl diglycol, hexyl glycol, hexyl diglycol, 2-ethylhexyl glycol, 2-ethythexyl diglycol, aryl glycol, phenyl glycol, phenyl diglycol, benzyl glycol, methylpropylene glycol, methylpropylene diglycol, methylpropylene triglycol, propylpropylene glycol, propylpropylene diglycol, butylpropylene glycol, butylpropylene diglycol, and phenylpropylene glycol. In some embodiments, greater than or equal to 80 wt. %, greater than or equal to 85 wt. %, greater than or equal to 90 wt. %, greater than or equal to 95 wt. %, or greater than or equal to 99 wt. % of the liquid carrier comprised in the polishing composition is composed of water.

Polishing Methods

In another aspect, the present disclosure relates to a method of polishing a substrate surface, wherein the substrate surface comprises a metal interconnect and a barrier layer on a $SiO_2$ layer derived from tetraethylorthosilicate ("TEOS"). The present disclosure relates to a method of polishing a substrate surface, wherein the substrate surface comprises copper and TEOS, the method comprising: contacting the substrate surface with the polishing composition according to any of the embodiments disclosed herein; and moving the polishing pad against the substrate surface while the polishing composition is in contact with the substrate surface, wherein the polishing achieves a topography correction of 30 nm or greater in terms of Cu dishing relative to the TEOS surface. (For purposes of this disclosure, a "TEOS substrate" or "TEOS layer" refers to a $SiO_2$ layer derived from tetraethylorthosilicate. Similarly, a "TEOS surface" refers to the uppermost surface of a TEOS layer.)

Cu Removal Rate ($RR_{Cu}$)

In some embodiments, the polishing achieves a copper removal rate of less than or equal to 250 Å/min, less than or equal to 240 Å/min, less than or equal to 230 Å/min, less than or equal to 220 Å/min, less than or equal to 210 Å/min, less than or equal to 200 Å/min, less than or equal to 190 Å/min, less than or equal to 180 Å/min, less than or equal to 170 Å/min, less than or equal to 160 Å/min, less than or equal to 150 Å/min, or any range or value therein between. In some embodiments, the polishing achieves a copper removal rate of greater than or equal to 150 Å/min, greater than or equal to 160 Å/min, greater than or equal to 170 Å/min, greater than or equal to 180 Å/min, greater than or equal to 190 Å/min, greater than or equal to 200 Å/min, greater than or equal to 210 Å/min, greater than or equal to 220 Å/min, greater than or equal to 230 Å/min, greater than or equal to 240 Å/min, greater than or equal to 250 Å/min, or any range or value therein between. In some embodiments, the polishing achieves a TEOS removal rate of less than or equal to 200 Å/min, less than or equal to 190 Å/min, less than or equal to 180 Å/min, less than or equal to 170 Å/min, less than or equal to 160 Å/min, less than or equal to 150 Å/min, less than or equal to 140 Å/min, less than or equal to 130 Å/min, less than or equal to 120 Å/min, or any range or value therein between.

TEOS Removal Rate ($RR_{TEOS}$)

In some embodiments, the polishing achieves a TEOS removal rate of greater than or equal to 100 Å/min, greater than or equal to 110 Å/min, greater than or equal to 120 Å/min, greater than or equal to 130 Å/min, greater than or equal to 140 Å/min, greater than or equal to 150 Å/min, greater than or equal to 160 Å/min, greater than or equal to 170 Å/min, greater than or equal to 180 Å/min, greater than or equal to 190 Å/min, greater than or equal to 200 Å/min, or any range or value therein between. In some embodiments, the polishing achieves a TEOS removal rate of less than or equal to 200 Å/min, less than or equal to 190 Å/min, less than or equal to 180 Å/min, less than or equal to 170 Å/min, less than or equal to 160 Å/min, less than or equal to 150 Å/min, less than or equal to 140 Å/min, less than or equal to 130 Å/min, less than or equal to 120 Å/min, or any range or value therein between.

Ta Removal Rate ($RR_{Ta}$)

In some embodiments, the polishing achieves a tantalum removal rate of greater than or equal to 100 Å/min, greater than or equal to 110 Å/min, greater than or equal to 120 Å/min, greater than or equal to 130 Å/min, greater than or equal to 140 Å/min, greater than or equal to 150 Å/min, greater than or equal to 160 Å/min, greater than or equal to 170 Å/min, greater than or equal to 180 Å/min, greater than or equal to 190 Å/min, greater than or equal to 200 Å/min, or any range or value therein between. In some embodiments, the polishing achieves a tantalum removal rate of less than or equal to 200 Å/min, less than or equal to 190 Å/min, less than or equal to 180 Å/min, less than or equal to 170 Å/min, less than or equal to 160 Å/min, less than or equal to 150 Å/min, less than or equal to 140 Å/min, less than or equal to 130 Å/min, less than or equal to 120 Å/min, or any range or value therein between.

$RR_{Ta}/RR_{TEOS}$

In some embodiments, the polishing achieves a Ta/TEOS polishing rate ratio of 1.00 or greater, 1.10 or greater, 1.15 or greater, 1.20 or greater, 1.25 or greater, 1.30 or greater, 1.35 or greater, 1.40 or greater, 1.45 or greater, or 1.50 or greater, or any range or value therein between.

Topography Correction

In practice, a height difference typically exists after Cu polishing, and the barrier polishing compositions are assessed for topography correction (nm). Thus, referring to FIG. 1F, if the height difference between the TEOS reference level and the top of Cu layer after barrier layer polishing is less than the height difference before barrier layer polishing, the topography is said to have been corrected, and the topography correction (before (nm)−after (nm)) will reflect a positive value. Likewise, if the height difference between the TEOS reference level and the top of the Cu layer after barrier layer polishing is greater than the height difference before barrier layer polishing, the topography correction (before (nm)−after (nm) will reflect a negative value.

Accordingly, the "more positive" or "less negative" the topography correction (nm), the better a given polishing composition is able to correct (or avoid exacerbating) non-ideal topography. Meanwhile, the "less positive" or "more negative" the topography correction (nm), the less a given polishing composition is able to correct (or avoid exacerbating) non-ideal topography. For purposes of this disclosure, a positive topography value (nm) indicates the top of the Cu layer is below the TEOS reference level.

In some embodiments, the polishing achieves a topography correction (e.g., "9 m/1 m dishing"), as determined by the amount of dishing (nm) before polishing minus the amount of dishing (nm) after polishing, of at least about 25 nm, at least about 30 nm, at least about 32 nm, at least about 35 nm, at least about 38 nm, at least about 40 nm, or any range or value therein between.

Reference will now be made in detail to some specific embodiments contemplated by the present disclosure. While various embodiments are described herein, it will be understood that it is not intended to limit the present technology to the described embodiments. On the contrary, it is intended to cover alternatives, modifications, and equivalents as may be included within the spirit and scope of the technology as defined by the appended claims.

The present invention includes the following aspects and embodiments.

1. A polishing composition comprising: an abrasive comprising silica particles having an average primary particle size of greater than 12 nm, and/or an average secondary particle size of greater than 30 nm; a phosphate surfactant; a water-soluble polymer; and an electric conductivity controller, wherein the silica particles have a D90/D50 ratio of greater than 1.3 or a D90/D10 ratio of greater than 1.7, and/or are surface-modified with an organic acid, the phosphate surfactant has 15 or less oxyethylene units and a straight chain or branched $C_4$ or more alkylphenyl, and is present at a concentration of less than 0.5 wt. %, relative to the total weight of the polishing composition, the electric conductivity controller is present at a concentration of less than 1 wt. %, relative to the total weight of the polishing composition, and a pH of the polishing composition is greater than 8 and less than 11.

2. The polishing composition according to 1., wherein the phosphate surfactant is present at a concentration of greater than 0.01 wt. %, relative to the total weight of the polishing composition.

3. The polishing composition according to 1, or 2., wherein the water-soluble polymer comprises a polysaccharide.

4. The polishing composition according to 3., wherein the polysaccharide comprises pullulan.

5. The polishing composition according to any one of 1. to 4., wherein the electric conductivity controller comprises a citrate salt.

6. The polishing composition according to 5., wherein the citrate salt is at least one of tripotassium citrate and ammonium citrate dibasic.

7. The polishing composition according to any one of 1. to 6., wherein the electric conductivity controller is present at a concentration of greater than 0.03 wt. %, relative to the total weight of the polishing composition.

8. The polishing composition according to any one of 1. to 7., wherein the phosphate surfactant is represented by the following formula (I):

$$[\text{tail-}(OC_2H_5)_n\text{—}O]_m\text{—}PO_qH_r \quad \text{(I)},$$

wherein $OC_2H_5$ is an oxyethylene unit; n is 1, 2, 3, 4, 5, 6, 7, 8, 9, 10, 11, 12, 13, 14, or 15; (m, q, r) is (1, 3, 2), (2, 2, 1), or (3, 1, 0); and the tail is a $C_4$ or more alkylphenyl.

9. The polishing composition according to 8., wherein n is 6, 7, 8, or 9, and/or the tail is a $C_5$ to $C_{11}$ alkylphenyl.

10. The polishing composition according to 9., wherein the phosphate surfactant is present at a concentration of greater than 0.01 wt. %, relative to the total weight of the polishing composition, the electric conductivity controller is present at a concentration of greater than 0.03 wt. %, relative to the total weight of the polishing composition, and the silica particles have an average primary particle size of less than 78 nm, and have a D90/D50 ratio of less than 1.9 when the silica particles are not surface-modified with an organic acid.

11. The polishing composition according to 10., wherein the phosphate surfactant is present at a concentration of less than 0.1 wt. %, relative to the total weight of the polishing composition.

12. The polishing composition according to 10. or 11., wherein the electric conductivity controller is present at a concentration of less than 0.5 wt. %, relative to the total weight of the polishing composition.

13. The polishing composition according to any one of 10. to 12., wherein the water-soluble polymer is present at a concentration of greater than 0.01 wt. %, relative to the total weight of the polishing composition.

EXAMPLES

Example 1. Materials and Methods

Preparation of Polishing Compositions

To investigate the effect of abrasive particle size and type, phosphate surfactant type and concentration, and electric conductivity controller type and concentration, on Cu, Ta, and TEOS removal rates, Ta/TEOS removal rate selectivity, and topography correction, polishing compositions comprising silica abrasive particles (see Table 1) were prepared and used to assess the removal rates of TEOS and Ta and Cu films deposited on silicon wafers having a thermal oxide layer derived from TEOS, along with the topography correction.

Polishing compositions comprising the abrasive particles shown in Table 1 were prepared by adding to deionized water, benzotriazole (BTA) as the corrosion inhibitor, an electric conductivity controller (see Table 3), an acid (organic acid) associated with the electrical conductivity controller to achieve pH buffering ability, the phosphate surfactant (see Table 2), pullulan as the water-soluble polymer, and silica abrasives (see Table 4), while mixing and finally adding deionized water to obtain the final volume. The pH of the composition was adjusted by monitoring the pH while adding potassium hydroxide as the pH adjusting agent until the selected composition pH was reached. pH Measurement The pH of polishing compositions according to the present disclosure was determined using a Thermo-Fisher Scientific VSTAR94 pH Meter.

Zeta Potential Measurement

Zeta potentials for various abrasives in polishing compositions according to the present disclosure were determined suing a ZETASIZER® (Malvern Panalytical). Zeta potential for various substrates polished using the polishing compositions according to the present disclosure were determined using a SurPASS™ 3 Zeta Potential Analyzer (Anton Paar GmbH).

Removal Rate Measurement

To determine polishing rates, the polishing compositions were applied to the following substrates:

For removal rate measurement:

Ta: 2000 Å Ta on thermal oxide on Si substrate (Advantiv);

Cu: 10,000 Å epitaxial Cu on TiN on thermal oxide on silicon (Advantiv); and

TEOS: 10,000 Å TEOS on Si substrate (Advantiv)

For topography correction measurement:

Patterned wafer: MIT754mask (7000 Å Cu; 100 Å Ta; 3000 Å TEOS)

Polishing rates were determined using the following polishing conditions:

Polisher: 300 mm Polisher (Reflexion LK);

Polishing pad: Fujibo H8000;

Conditioner: 3M A82;

Down force: 1.0 psi

Platen rotation: 73 rpm;

Head rotation: 63 rpm;

Slurry flow rate: 200 mL/min.

The polishing rate can be measured by determining the thickness with an optical film thickness measurement system (ASET-f5x: manufactured by KLA-Tencor) and dividing (thickness before polishing)−(thickness after polishing) by the polishing time.

To assess the removal rates achieved by the polishing compositions, film thickness before and after polishing was measured using a Resmap Resistivity Mapping System (Creative Design Engineering, Inc.) for Ta and Cu films, or a KLA ASET-F5X Pro Optical Thin Film Measurement System (KLA Corporation) for TEOS substrates.

Topography Correction Measurements

Figure 1B:
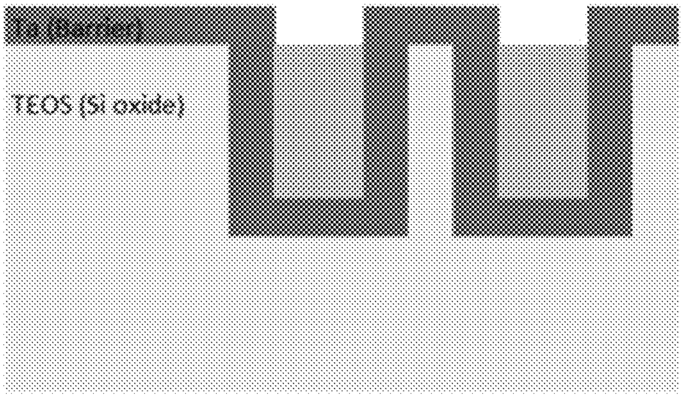
FIG. 1B is a schematic illustration of the patterned wafer in FIG. 1A after Cu polishing, leaving the Ta barrier layer across the entire wafer and patterned Cu interconnects in the trenches.

Referring to FIGS. 1A-1F, to assess topography correction, a patterned Si wafer with a 3000 Å thermal oxide (derived from TEOS) was patterned with trenches for depositing Cu lines. As shown in FIG. 1A, for a "9/1" pattern, the trench is 1 μm wide, while the inter-trench spacing is 9 μm. A Ta barrier layer (100 Å) was deposited across the patterned wafer, followed by a 7000 Å Cu layer. Referring to FIG. 1B, the Cu film was polished using a Cu polishing slurry, leaving behind a barrier layer and Cu lines within the trenches.

Figure 1C:
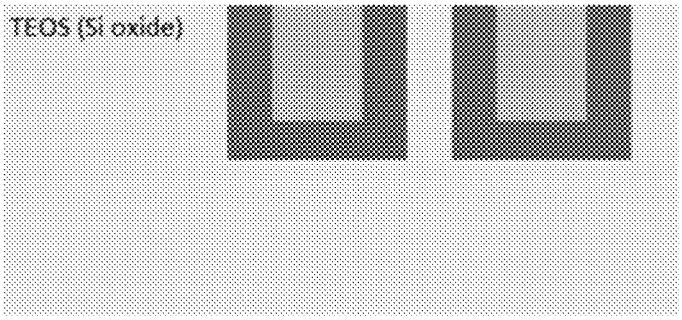
FIG. 1C is a schematic illustration of ideal surface topography after barrier layer polishing the patterned wafer in FIG. 1B. The tops of the Cu and Ta layers are approximately level with the top of the thermal oxide layer on the non-patterned portion of the wafer.
Figure 1D:
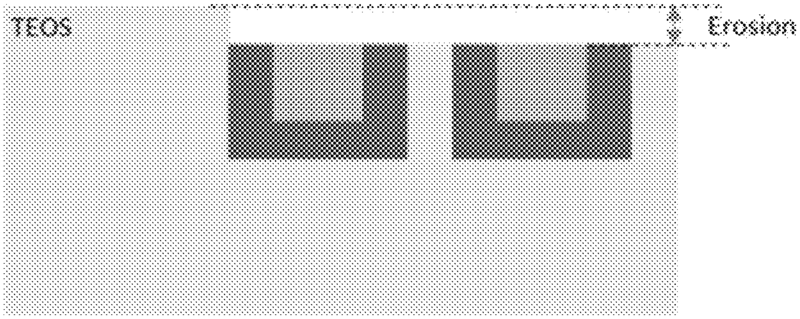
FIG. 1D is a schematic illustration of non-ideal surface topography after barrier layer polishing the patterned wafer in FIG. 1B, where the tops of the Cu and Ta layers are below the top of the thermal oxide layer on the non-patterned portion of the wafer. The amount of erosion is the difference in height between the thermal oxide and Cu or Ta layers.
Figure 1E:
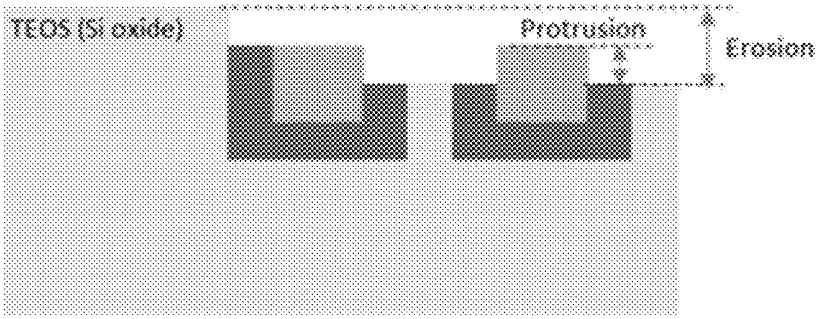
FIG. 1E is a schematic illustration of non-deal surface topography after barrier layer polishing the patterned wafer in FIG. 1B, where the top of the Ta barrier layer is below the top of the thermal oxide layer on the non-patterned portion of the wafer (erosion), and the Cu layer protrudes above the top of the Ta barrier layer due to non-ideal Ta/Cu removal rate selectivity.
Figure 1F:
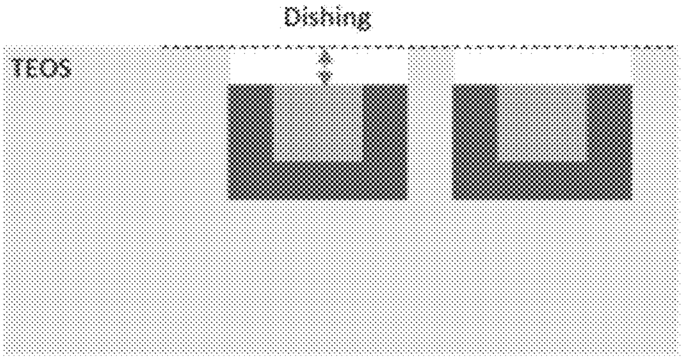
FIG. 1F is a schematic illustration of non-ideal surface topography after barrier layer polishing the patterned wafer in FIG. 1B, where top of the Cu layer (and optionally the top of the Ta layer) is below the top of the thermal oxide layer on the non-patterned and patterned portions of the wafer, due to Cu "dishing."

The patterned wafers with Cu lines were then subjected to barrier layer polishing using polishing compositions according to the present disclosure, according to the conditions disclosed above. Referring to FIG. 1C, if the barrier layer polishing conditions have ideal Ta/TEOS and Cu/TEOS selectivity, the top of the TEOS layer on the non-patterned portion of the surface ("the TEOS reference level") will be nearly level with the top of the Cu layer after barrier layer polishing. Referring to FIGS. 1D-1F, if the barrier layer polishing conditions have non-ideal Ta/TEOS and Cu/TEOS selectivity, there will be a height difference between the top of the TEOS layer on the non-patterned portion of the surface ("the TEOS reference level") and the top of the Cu layer after barrier layer polishing. This will result in erosion, protrusions, and dishing.

In practice, a height difference typically exists after Cu polishing, and the barrier polishing compositions are assessed for topography correction (nm). Thus, referring to FIG. 1F, if the height difference between the TEOS reference level and the top of Cu layer after barrier layer polishing is less than the height difference before barrier layer polishing, the topography is said to have been corrected, and the topography correction (before (nm)−after (nm)) will reflect a positive value. Likewise, if the height difference between the TEOS reference level and the top of the Cu layer after barrier layer polishing is greater than the height difference before barrier layer polishing, the topography correction (before (nm)−after (nm) will reflect a negative value. Accordingly, the "more positive" or "less negative" the topography correction (nm), the better a given polishing composition is able to correct (or avoid exacerbating) non-ideal topography. Meanwhile, the "less positive" or "more negative" the topography correction (nm), the less a given polishing composition is able to correct (or avoid exacerbating) non-ideal topography. For purposes of this disclosure, a positive topography value (nm) indicates the top of the Cu layer is below the TEOS reference level.

To assess topography correction, surface topography was measured using a Park Systems XE-120 AFM (Park Systems).

TABLE 1

Abrasives Used in Polishing Compositions

| Abrasive | Surface Modification | (1) Primary Particle Size (nm) | (2) Secondary Particle Size (nm) | (2)/(1) | D90 (nm) | D50 (nm) | D10 (nm) | D90/D50 | D90/D10 | Sitanol Group Density ($nm^{-2}$) | Zeta Potential @ pH 10 (mV) | Aspect ratio |
|---|---|---|---|---|---|---|---|---|---|---|---|---|
| 1 | sulfonic acid | 30 | 70 | 2.3 | 81 | 70 | 58 | 1.2 | 1.4 | 6.2 | −38 | 1.2 |
| 2 | none | 30 | 70 | 2.3 | 81 | 70 | 58 | 1.2 | 1.4 | 6.2 | −38 | 1.2 |
| 3 | sulfonic acid | 78 | 120 | 1.5 | 144 | 109 | 83 | 1.3 | 1.7 | 6.5 | −43 | 1.4 |
| 4 | none | 78 | 120 | 1.5 | 144 | 109 | 83 | 1.3 | 1.7 | 6.5 | −43 | 1.4 |
| 5 | Sulfonic acid | 12 | 30 | 2.5 | 42 | 30 | 21 | 1.4 | 2.0 | 6.2 | −41 | 1.3 |
| 6 | none | 12 | 30 | 2.5 | 42 | 30 | 21 | 1.4 | 2.0 | 6.2 | −41 | 1.3 |
| 7 | none | 36 | 58 | 1.6 | 101 | 58 | 34 | 1.7 | 3.0 | 5.8 | −38 | 1.4 |
| 8 | none | 65 | 112 | 1.7 | 211 | 112 | 74 | 1.9 | 2.9 | 5.9 | −39 | 1.6 |

* The primary particle sizes listed in Table 1 mean the average primary particle diameters, and the secondary particle sizes mean the average secondary particle diameters.

Example 2. Effect of Phosphate Surfactant on Polishing Performance

To assess the effect of surfactant type and concentration on polishing performance, the polishing compositions shown in Table 2 were prepared according to the procedure described in Example 1, and their removal rates for Ta, Cu, and TEOS, removal rate selectivities, and topography correction were assessed according to the methods disclosed above in Example 1. Although the types and concentrations of phosphate surfactants were varied, all polishing compositions tested comprised the following components at the following concentrations:

As shown in Table 2, polishing compositions comprising Abrasive 1 (sulfonic acid-modified silica; 30 nm) and polyoxyethylene (7) nonylphenyl phosphate (e.g., Slurries 2-4, 16-17) or polyoxyethylene (10) nonyl phenyl phosphate (e.g., Slurry 8) showed excellent topography correction performance, Ta removal rate, Cu removal rate, TEOS removal rate, and Ta/TEOS selectivity. In particular, slurries comprising 0.01 wt. % to 0.1 wt. % polyoxyethylene (7) nonylphenyl phosphate showed the greatest extent of topography correction, along with suitable Cu removal rates and good Ta/TEOS removal rate selectivity, particularly at pH values of between 9 and 10.5 (see Slurries 2-4 and 16-17).

TABLE 2

Effect of Phosphate Surfactant on Polishing Performance

| Slurry | Phosphate Surfactant Type | Phosphate Surfactant Conc. (wt. %) | pH | Removal Rate (Å/min) Ta | Removal Rate (Å/min) Cu | Removal Rate (Å/min) TEOS | Ta/TEOS Selectivity | 9 μm/1 μm Dishing Pre | 9 μm/1 μm Dishing Post | 9 μm/1 μm Topography Correction |
|---|---|---|---|---|---|---|---|---|---|---|
| 1 | POE(7)-nonylphenylphosphate | 0 | 10 | 150 | 200 | 110 | 1.36 | 60 | 45 | 15 |
| 2 | POE(7)-nonylphenylphosphate | 0.01 | 10 | 151 | 198 | 109 | 1.39 | 62 | 32 | 30 |
| 3 | POE(7)-nonylphenylphosphate | 0.05 | 10 | 150 | 189 | 110 | 1.36 | 61 | 25 | 36 |
| 4 | POE(7)-nonylphenylphosphate | 0.1 | 10 | 148 | 176 | 107 | 1.38 | 58 | 24 | 34 |
| 5 | POE(7)-nonylphenylphosphate | 0.5 | 10 | 113 | 155 | 103 | 1.10 | 60 | 43 | 17 |
| 6 | POE(7)-nonylphenylphosphate | 1 | 10 | 98 | 143 | 105 | 0.93 | 61 | 47 | 14 |
| 7 | POE(5)-nonylphenylphosphate | 0.05 | 10 | 148 | 188 | 108 | 1.37 | 57 | 28 | 29 |
| 8 | POE(10)-nonylphenylphosphate | 0.05 | 10 | 148 | 186 | 109 | 1.36 | 60 | 28 | 32 |
| 9 | POE(12)-nonylphenylphosphate | 0.05 | 10 | 153 | 188 | 103 | 1.49 | 58 | 30 | 28 |
| 10 | POE(16)-nonylphenylphosphate | 0.05 | 10 | 155 | 190 | 85 | 1.82 | 60 | 45 | 15 |
| 11 | POE(7)-phenylphosphate | 0.05 | 10 | 111 | 171 | 101 | 1.10 | 61 | 47 | 14 |
| 12 | POE(7) dodecylphenylphosphate | 0.05 | 10 | 144 | 178 | 103 | 1.40 | 60 | 33 | 27 |
| 13 | POE (7)-nonylphosphate | 0.05 | 10 | 109 | 111 | 97 | 1.12 | 57 | 43 | 14 |
| 14 | POE(7)-propylphenylphosphate | 0.05 | 10 | 111 | 109 | 89 | 1.25 | 61 | 51 | 10 |
| 15 | POE(7)-nonylphenylphosphate | 0.05 | 11 | 121 | 321 | 111 | 1.09 | 61 | 51 | 10 |
| 16 | POE (7)-nonylphenylphosphate | 0.05 | 10.5 | 155 | 199 | 110 | 1.41 | 59 | 25 | 34 |
| 17 | POE (7)-nonylphenylphosphate | 0.05 | 9 | 143 | 123 | 111 | 1.29 | 61 | 25 | 36 |
| 18 | POE (7)-nonylphenylphosphate | 0.05 | 8 | 112 | 101 | 76 | 1.47 | 60 | 58 | 2 |

2.2 wt. % Abrasive 1 (see Table 1);
Amount of KOH to adjust pH to desired value;
0.1 wt. % citric acid;
0.05 wt. % BTA;
0.08 wt. % pullulan;
1.0 wt. % $H_2O_2$; and
0.1 wt. % tripotassium citrate.

As described above, the pH of the composition was adjusted by monitoring the pH while potassium hydroxide (KOH) is added.

Example 3. Effect of Electrical Conductivity Controller and Water-Soluble Polymer on Polishing Performance To assess the effect of the type and concentration of EC controller and concentration of water-soluble polymer on polishing performance, the polishing compositions shown in Table 3 were prepared and their removal rates for Ta, Cu, and TEOS, removal rate selectivities, and topography correction were assessed according to the methods disclosed above in Example 1. The types and concentrations of EC controllers, and the concentrations of water-soluble polymer (pullulan), were varied. All polishing compositions tested comprised the following components at the following concentrations:

0.05 wt. % POE(7)-nonylphenylphosphate;
2.2 wt. % Abrasive 1 (see Table 1);
0.2 wt. % KOH;
0.1 wt. % citric acid;
0.05 wt. % BTA; and
1.0 wt. % $H_2O_2$.

As shown in Table 3, polishing compositions comprising no water-soluble polymer show poor topography correction, while polishing compositions comprising 0.01 wt. % to 0.08 wt. % pullulan show excellent topography correction (e.g., above 30 nm) (see Slurries 3, 21, 23, 24, and 26). Polishing compositions comprising an EC controller at too low or too high concentration (e.g., 0 wt. % or 1 wt. %) show poor topography correction (see Slurries 22 and 25), while polishing compositions comprising 0.03 wt. % to 0.5 wt. % tripotassium citrate as EC controller have excellent topography correction (e.g., above 30 nm) (see Slurries 3, 21, 23, and 24).

were assessed according to the methods disclosed above in Example 1. The type of abrasive was varied, but all abrasives were present at the same concentration (2.2 wt. %). All polishing compositions tested had a pH of 10 and comprised the following components at the following concentrations:

2.2 wt. % Abrasive (see Table 4);
0.2 wt. % KOH;
0.1 wt. % citric acid;
0.05 wt. % BTA;
0.08 wt. % pullulan;
0.05 wt. % POE(7) nonylphenyl phosphate;
0.1 wt. % tripotassium citrate; and
1.0 wt. % $H_2O_2$.

As shown in Table 4, polishing compositions comprising Abrasives 1, 3, 7, and 8 (Slurries 3, 28, 32 and 33; with average primary particle size of 30 nm or greater) showed excellent topography correction, Cu removal rate, Ta removal rate, TEOS removal rate, and Ta/TEOS selectivity. Meanwhile, Abrasives 5 and 6, with an average primary particle size less than 30 nm (Slurries 30 and 31) did not achieve good topography correction.

Additionally, unmodified abrasives with an average primary particle size of 30 nm or greater and a relatively broad particle size distribution (e.g., D90/D10 ratio of greater than 1.3; see Slurries 32 and 33) showed better polishing performance (topography correction, Cu removal rate, Ta removal rate, TEOS removal rate) than unmodified abrasives with average primary particle size of 30 nm or greater and a relatively narrow particle size distribution (e.g., D90/D10 ratio of 1.4 or less; see Slurries 27 and 29).

TABLE 3

Effect of Electrical Conductivity Controller and Water-Soluble Polymer on Polishing Performance

| | EC Controller | | Water-Soluble Polymer | | | Removal Rate (Å/min) | | | Ta/TEOS | 9 μm/1 μm Dishing | | Topography |
|---|---|---|---|---|---|---|---|---|---|---|---|---|
| Slurry | Type | Conc. (wt. %) | Type | Conc. (wt. %) | pH | Ta | Cu | TEOS | Selectivity | Pre | Post | Correction |
| 3 | tripotassium citrate | 0.1 | pullulan | 0.08 | 10 | 150 | 189 | 110 | 1.36 | 61 | 25 | 36 |
| 19 | tripotassium citrate | 0.1 | pullulan | 0 | 10 | 100 | 123 | 108 | 0.93 | 60 | 41 | 19 |
| 20 | tripotassium citrate | 0.1 | pullulan | 0 | 10 | 138 | 176 | 110 | 1.25 | 60 | 41 | 19 |
| 21 | tripotassium citrate | 0.1 | pullulan | 0.01 | 10 | 144 | 181 | 107 | 1.35 | 61 | 27 | 34 |
| 22 | tripotassium citrate | 0 | pullulan | 0.08 | 10 | 101 | 121 | 76 | 1.33 | 60 | 51 | 9 |
| 23 | tripotassium citrate | 0.03 | pullulan | 0.08 | 10 | 133 | 147 | 98 | 1.36 | 62 | 31 | 31 |
| 24 | tripotassium citrate | 0.5 | pullulan | 0.08 | 10 | 168 | 188 | 110 | 1.53 | 59 | 24 | 35 |
| 25 | tripotassium citrate | 1 | pullulan | 0.08 | 10 | 171 | 201 | 131 | 1.31 | 61 | 51 | 10 |
| 26 | ammonium citrate dibasic | 0.1 | pullulan | 0.08 | 10 | 145 | 177 | 108 | 1.34 | 61 | 26 | 35 |

Example 4. Effect of Abrasive Type on Polishing Performance

To assess the effect of the abrasive type on polishing performance, the polishing compositions shown in Table 4 were prepared, and their removal rates for Ta, Cu, and TEOS, removal rate selectivities, and topography correction

TABLE 4

Effect of Abrasive Type on Polishing Performance

| | Abrasive (see Table 1) | | | Removal Rate (Å/min) | | | Ta/TEOS | 9 μm/1 μm Dishing | | Topography |
|---|---|---|---|---|---|---|---|---|---|---|
| Slurry | Type | Average Primary Diameter (nm) | Surface Modification | Ta | Cu | TEOS | Selectivity | Pre | Post | Correction |
| 3 | 1 | 30 | sulfonic acid | 150 | 189 | 110 | 1.36 | 61 | 25 | 36 |
| 27 | 2 | 30 | none | 121 | 141 | 78 | 1.55 | 60 | 51 | 9 |
| 28 | 3 | 78 | sulfonic acid | 141 | 176 | 101 | 1.40 | 65 | 33 | 32 |
| 29 | 4 | 78 | none | 110 | 144 | 78 | 1.41 | 61 | 50 | 11 |
| 30 | 5 | 12 | sulfonic acid | 121 | 133 | 45 | 2.69 | 61 | 46 | 15 |

TABLE 4-continued

Effect of Abrasive Type on Polishing Performance

| | Abrasive (see Table 1) | | | | | | | | | |
|---|---|---|---|---|---|---|---|---|---|---|
| | | Average Primary Diameter | Surface | Removal Rate (Å/min) | | | Ta/TEOS | 9 μm/1 μm Dishing | | Topography |
| Slurry | Type | (nm) | Modification | Ta | Cu | TEOS | Selectivity | Pre | Post | Correction |
| 31 | 6 | 12 | none | 118 | 121 | 61 | 1.93 | 60 | 49 | 11 |
| 32 | 7 | 36 | none | 167 | 145 | 121 | 1.38 | 61 | 27 | 34 |
| 33 | 8 | 65 | none | 166 | 132 | 117 | 1.42 | 60 | 29 | 31 |

While certain embodiments have been illustrated and described, it should be understood that changes and modifications may be made therein in accordance with ordinary skill in the art without departing from the technology in its broader aspects as defined in the following claims.

The compositions and methods illustratively described herein may suitably be practiced in the absence of any element or elements, limitation or limitations, not specifically disclosed herein. Thus, for example, the terms "comprising", "including," containing", etc. shall be read expansively and without limitation. Additionally, the terms and expressions employed herein have been used as terms of description and not of limitation, and there is no intention in the use of such terms and expressions of excluding any equivalents of the features shown and described or portions thereof. It is recognized that various modifications are possible within the scope of the disclosure claimed. Thus, it should be understood that although the present disclosure has been specifically disclosed by preferred embodiments and optional features, modification and variation of the disclosure embodied therein herein disclosed may be resorted to by those skilled in the art, and that such modifications and variations are considered to be within the scope of this disclosure.

The disclosure has been described broadly and generically herein. Each of the narrower species and subgeneric groupings falling within the generic disclosure also form part of the methods. This includes the generic description of the methods with a proviso or negative limitation removing any subject matter from the genus, regardless of whether or not the excised material is specifically recited herein. The present technology is not to be limited in terms of the particular embodiments described in this application, which are intended as single illustrations of individual aspects of the present technology. Many modifications and variations of this present technology can be made without departing from its spirit and scope, as will be apparent to those skilled in the art. Functionally equivalent methods and apparatuses within the scope of the present technology, in addition to those enumerated herein, will be apparent to those skilled in the art from the foregoing descriptions. Such modifications and variations are intended to fall within the scope of the present technology. It is to be understood that this present technology is not limited to particular methods, reagents, compounds compositions or biological systems, which can, of course, vary. It is also to be understood that the terminology used herein is for the purpose of describing particular embodiments only, and is not intended to be limiting.

One skilled in the art readily appreciates that the present disclosure is well adapted to carry out the objects and obtain the ends and advantages mentioned, as well as those inherent therein. Modifications therein and other uses will occur to those skilled in the art. These modifications are encompassed within the spirit of the disclosure and are defined by the scope of the claims, which set forth non-limiting embodiments of the disclosure.

In addition, where features or aspects of the disclosure are described in terms of Markush groups, those skilled in the art will recognize that the disclosure is also thereby described in terms of any individual member or subgroup of members of the Markush group.

All references, articles, publications, patents, patent publications, and patent applications cited herein are incorporated by reference in their entireties for all purposes. However, mention of any reference, article, publication, patent, patent publication, and patent application cited herein is not, and should not be taken as, an acknowledgment or any form of suggestion that they constitute valid prior art or form part of the common general knowledge in any country in the world.

Other embodiments are set forth in the following claims.

The present application is based on U.S. Provisional Patent Application No. 63/540,817, filed on Sep. 27, 2023, the disclosure of which is incorporated herein in its entirety by reference.

What is claimed is:

1. A polishing composition, comprising:

an abrasive comprising silica particles having an average primary particle size of greater than 12 nm, and/or an average secondary particle size of greater than 30 nm;

a phosphate surfactant;

a water-soluble polymer; and an electric conductivity controller, wherein the silica particles have a D90/D50 ratio of greater than 1.3 or a D90/D10 ratio of greater than 1.7, and/or are surface-modified with an organic acid, the phosphate surfactant has 15 or less oxyethylene units and a straight chain or branched $C_4$ or more alkylphenyl, and is present at a concentration of less than 0.5 wt. %, relative to the total weight of the polishing composition, the electric conductivity controller is present at a concentration of less than 1 wt. %, relative to the total weight of the polishing composition, and a pH of the polishing composition is greater than 8 and less than 11.

2. The polishing composition according to claim 1, wherein the phosphate surfactant is present at a concentration of greater than 0.01 wt. %, relative to the total weight of the polishing composition.

3. The polishing composition according to claim 1, wherein the water-soluble polymer comprises polysaccharide.

4. The polishing composition according to claim 3, wherein the polysaccharide comprises pullulan.

5. The polishing composition according to claim 1, wherein the electric conductivity controller comprises a citrate salt.

6. The polishing composition according to claim 5, wherein the citrate salt is at least one of tripotassium citrate and ammonium citrate dibasic.

7. The polishing composition according to claim 1, wherein the electric conductivity controller is present at a concentration of greater than 0.03 wt. %, relative to the total weight of the polishing composition.

8. The polishing composition according to claim 1, wherein the phosphate surfactant is represented by the following formula (I):

$$[\text{tail-}(OC_2H_5)_n\text{—}O]_m\text{—}PO_qH_r \quad \text{(I)},$$

wherein $OC_2H_5$ is an oxyethylene unit;

n is 1, 2, 3, 4, 5, 6, 7, 8, 9, 10, 11, 12, 13, 14, or 15;

(m, q, r) is (1, 3, 2), (2, 2, 1), or (3, 1, 0); and the tail is a $C_4$ or more alkylphenyl.

9. The polishing composition according to claim 8, wherein n is 6, 7, 8, or 9, and/or the tail is a $C_5$ to $C_{11}$ alkylphenyl.

10. The polishing composition according to claim 9, wherein the phosphate surfactant is present at a concentration of greater than 0.01 wt. %, relative to the total weight of the polishing composition, the electric conductivity controller is present at a concentration of greater than 0.03 wt. %, relative to the total weight of the polishing composition, and the silica particles have an average primary particle size of less than 78 nm, and have a D90/D50 ratio of less than 1.9 when the silica particles are not surface-modified with an organic acid.

11. The polishing composition according to claim 10, wherein the phosphate surfactant is present at a concentration of less than 0.1 wt. %, relative to the total weight of the polishing composition.

12. The polishing composition according to claim 10, wherein the electric conductivity controller is present at a concentration of less than 0.5 wt. %, relative to the total weight of the polishing composition.

13. The polishing composition according to claim 10, wherein the water-soluble polymer is present at a concentration of greater than 0.01 wt. %, relative to the total weight of the polishing composition.

* * * * *